United States Patent [19]

Beeson et al.

[11] Patent Number: 5,396,350
[45] Date of Patent: Mar. 7, 1995

[54] BACKLIGHTING APPARATUS EMPLOYING AN ARRAY OF MICROPRISMS

[75] Inventors: Karl W. Beeson, Princeton; Scott M. Zimmerman, Basking Ridge; Paul M. Ferm, Morristown, all of N.J.

[73] Assignee: AlliedSignal Inc., Morris Township, Morris County, N.J.

[21] Appl. No.: 149,219

[22] Filed: Nov. 5, 1993

[51] Int. Cl.$^6$ ............................................. G02F 1/1335
[52] U.S. Cl. ...................................... 359/40; 359/48; 359/251; 353/81
[58] Field of Search ............... 359/40, 42, 48, 49, 359/245, 246, 247, 251; 353/33, 81

[56] References Cited

U.S. PATENT DOCUMENTS

| | | | |
|---|---|---|---|
| 3,863,246 | 1/1975 | Trcka et al. | 377/487 |
| 4,043,636 | 8/1977 | Eberhardt et al. | 359/48 |
| 4,330,813 | 5/1982 | Deutsch | 359/48 |
| 4,365,869 | 12/1982 | Hareng et al. | 350/345 |
| 4,686,519 | 8/1987 | Yoshida et al. | 340/701 |
| 4,726,662 | 2/1988 | Cromack | 350/345 |
| 4,799,137 | 1/1989 | Aho | 362/309 |
| 4,874,228 | 10/1989 | Aho et al. | 350/345 |
| 5,050,946 | 9/1991 | Hathaway et al. | 385/33 |
| 5,099,343 | 3/1992 | Margerum et al. | 359/48 |
| 5,101,279 | 3/1992 | Kurematsu et al. | 358/241 |
| 5,126,882 | 6/1992 | Oe et al. | 359/619 |
| 5,128,783 | 7/1992 | Abileah et al. | 359/49 |
| 5,128,787 | 7/1992 | Blonder | 359/70 |
| 5,151,801 | 9/1992 | Hiroshima | 359/40 |
| 5,161,041 | 11/1992 | Abileah et al. | 359/40 |
| 5,182,663 | 1/1993 | Jones | 359/70 |
| 5,202,950 | 4/1993 | Arego et al. | 385/146 |
| 5,206,746 | 4/1993 | Ooi et al. | 359/40 |
| 5,237,641 | 8/1993 | Jacobson et al. | 385/146 |
| 5,253,089 | 10/1993 | Imai | 359/49 |
| 5,253,151 | 10/1993 | Mepham et al. | 362/216 |
| 5,262,880 | 11/1993 | Abileah | 359/40 |
| 5,262,928 | 11/1993 | Kashima et al. | 362/31 |
| 5,267,062 | 11/1993 | Bottorf | 359/40 |
| 5,267,063 | 11/1993 | Ray | 359/49 |
| 5,276,538 | 1/1994 | Monji et al. | 359/40 |
| 5,278,545 | 1/1994 | Streck | 345/102 |
| 5,280,371 | 1/1994 | McCartney, Jr. et al. | 359/40 |
| 5,295,048 | 3/1994 | Park et al. | 362/26 |

FOREIGN PATENT DOCUMENTS

| | | |
|---|---|---|
| 0500960A1 | 2/1992 | European Pat. Off. |
| 60-201326 | 10/1985 | Japan |
| 64-35416 | 2/1989 | Japan |
| 45505 | 2/1993 | Japan |
| 60908 | 3/1993 | Japan |
| 89827 | 4/1993 | Japan |
| WO9400780 | 1/1994 | WIPO |
| WO94/06051 | 3/1994 | WIPO ............ G02B 5/02 |
| WO94/09395 | 4/1994 | WIPO |

*Primary Examiner*—William L. Sikes
*Assistant Examiner*—Huy Mai
*Attorney, Agent, or Firm*—Verne E. Kreger, Jr.

[57] ABSTRACT

An improved backlighting apparatus comprising a slab waveguide that accepts light rays generated by a light source and transmits the light rays via total internal reflection. Attached on one face of the slab waveguide is an array of microprisms, with each microprism having an light input surface parallel to a light output surface and at least one sidewall tilted at an angle from the direction normal to the surface of the waveguide such that light rays escape from the slab waveguide, reflect off the tilted sidewall and emerge from the microprism as a light source substantially perpendicular to the light output surface. An array of microlenses may be positioned to accept the output of the microprisms so that the light exiting from the microlenses is substantially more perpendicular. The backlight apparatus is advantageously used as a backlighting means for flat panel electronic displays.

19 Claims, 10 Drawing Sheets

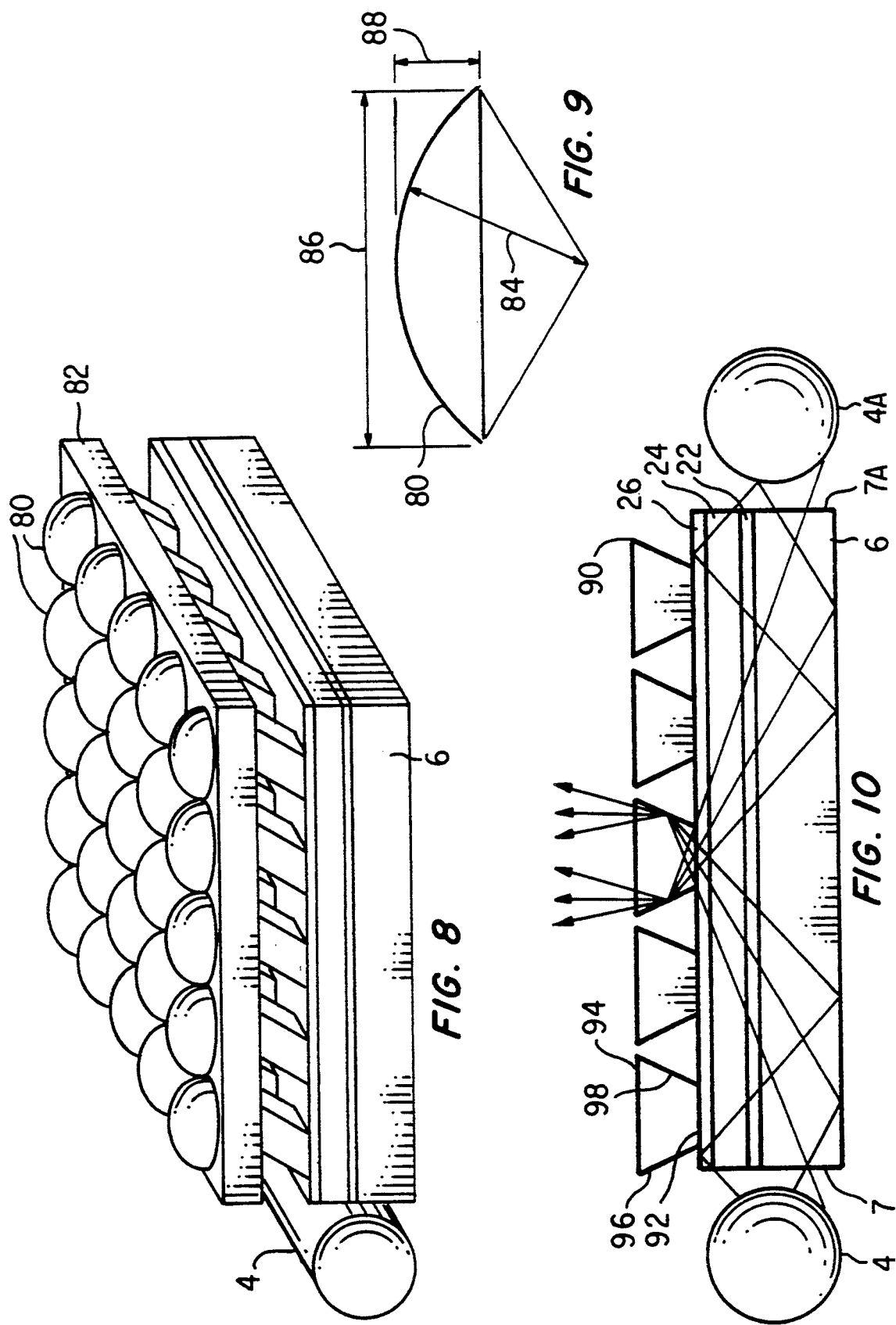

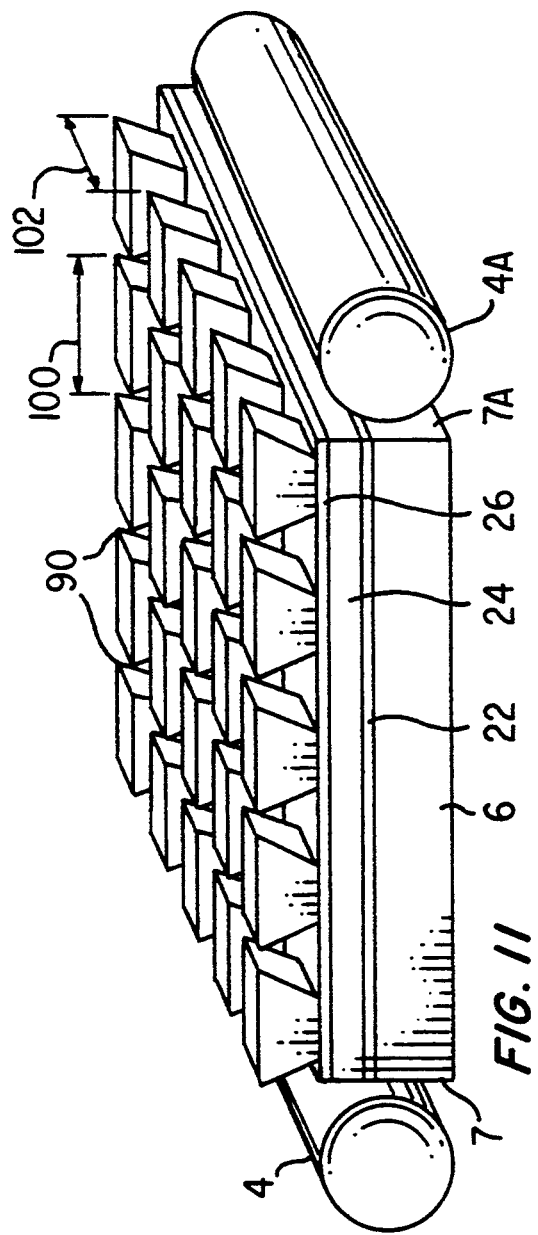
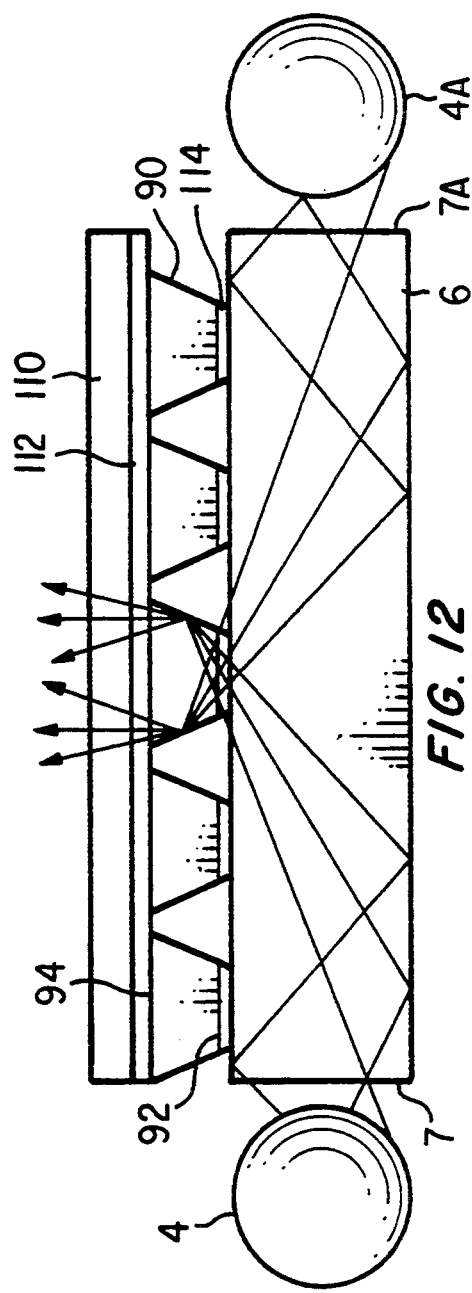

BACKLIGHTING APPARATUS EMPLOYING AN ARRAY OF MICROPRISMS

BACKGROUND OF THE INVENTION a. Field of the Invention

This invention relates generally to flat panel electronic displays, and more particularly, relates to an apparatus for collimating light as applied advantageously as a backlighting means that provides for relatively high light transmission for liquid crystal displays or the like.

b. Description of Related Art

There has been an extensive ongoing effort to provide large, full color display systems which do not rely upon the conventional cathode ray tube. See, for example, "Flat-Panel Displays," Scientific American, March 1993, pages 90–97. In systems such as television receivers, computer monitors, avionics displays, aerospace displays and military-related displays, the elimination of cathode ray tube technology is desirable. See U.S. Pat. Nos. 4,843,381, 5,128,783 and, 5,161,041 for a discussion of the disadvantages of cathode ray tube technology.

Display devices, as for example, projection display devices, off screen display devices and direct-view displays are known. See for example, EPO 0 525 755 A1; U.S. Pat. Nos. 4,659,185, 5,132,830 and 5,159,478; and Japanese Publication Nos. 245106 and 42241. Such displays are used in a wide range of applications including televisions, computer monitors, avionics displays, aerospace displays, automotive instrument panels and other devices that provide text, graphics or video information. These types of displays can replace conventional cathode ray tube displays and offer advantages such as lower profile, reduced weight and lower power consumption.

One display which can eliminate the shortcomings of a cathode ray tube is the flat panel liquid crystal display (LCD). LCDs are typically either reflective or transmissive. A reflective display is one which depends upon ambient light conditions in order to view the display. A transmissive LCD requires an illuminating means or backlight to ensure that the display image is as bright as possible. LCDs suffer from a number of inherent disadvantages. For example, at high viewing angles (large angles from the direction normal to the surface of the display), LCDs exhibit low contrast and changes in visual chromaticity as the viewing angle changes.

The characteristics of the backlighting apparatus are very important to both the quality of the image displayed by the matrix array of picture elements of the LCD and the profile of the display. See U.S. Pat. Nos. 5,128,783 and 5,161,041 for a discussion of the deficiencies in past backlighting configurations.

Additionally, current backlighting systems, in applications such as laptop computers, are inefficient with regard to the amount of light that the viewer sees versus the light produced by the source. Only about ten to twenty percent of the light generated by the light source ends up being usefully transmitted through the computer display. Any increase in the light throughput will positively impact power consumption and ultimately increase the battery life of a portable computer.

Accordingly, there exists a need in the flat panel electronic display art to provide a backlight assembly that provides an energy efficient and uniform light source for the electronic display while maintaining a narrow profile.

SUMMARY OF THE INVENTION

The present invention is directed to direct-view flat panel displays, and specifically to a liquid crystal display, having an improved backlight assembly which provides an energy efficient and uniform light source. Additionally, this invention is directed to any lighting application that requires a low profile, substantially collimated light source.

The flat panel electronic display comprises: a modulating means that is capable of projecting an image to a remotely positioned observer, the modulating means spacedly disposed from an improved backlit assembly comprising a light source in close proximity to a light transmitting means, the light source being positioned so that the light rays travel through the light transmitting means in a direction substantially parallel to the plane of the modulating means; and a reflecting means for collimating the light rays emanating from the light source, said reflecting means operatively disposed between and in close proximity to said light transmitting means and said modulating means. The improvement in the display through the use of the present invention is that the reflecting means provide an energy efficient, bright and uniform distribution of light that is provided in a low profile assembly.

In one preferred embodiment, the light source is positioned adjacent to a light accepting surface of the light transmitting means so that the light rays emanating from the light source travel in a direction substantially parallel to the plane of the modulating means. The light transmitting means may be any structure that transmits light rays via reflection, such as a light pipe, light wedge, slab waveguide or any other structure known to those skilled in the art. Preferably the light transmitting means comprises a slab waveguide that accepts the light rays generated by the light source and transports the light via total internal reflection (TIR). Attached on one face of the slab waveguide is an array of microprisms. The microprisms comprise a light input surface adjacent to the slab waveguide and a light output surface distal to and parallel with the light input surface. Preferably the microprisms further comprise a tilted sidewall angled in such a way that light rays escape from the slab waveguide, reflect through the microprisms via TIR and emerge from the microprisms as a substantially collimated light source in a direction substantially perpendicular to the modulating means.

In another preferred embodiment two light sources are positioned adjacent to oppositely disposed light accepting surfaces of the light transmitting means. The light transmitting means comprises a slab waveguide that accepts the light rays generated by both light sources and transports the light rays via TIR. Attached on one face of the slab waveguide is an array of microprisms. The microprisms comprise oppositely disposed tilted side walls that are angled in such a way that light rays traveling in two directions along the slab waveguide escape from the slab waveguide and reflect through the microprisms via TIR and emerge from the microprisms as a substantially collimated light source in a direction substantially perpendicular to the modulating means.

In still a further embodiment, four light sources are positioned adjacent to separate light accepting surfaces of a slab waveguide that accepts the light rays generated by all four light sources and transports the light rays via TIR. Attached on one face of the slab waveguide is an array of microprisms. The microprisms comprise four tilted side walls that are angled in such a way that light rays traveling in four directions along the slab waveguide escape from the waveguide and reflect through the microprisms and emerge as a substantially collimated light source in a direction substantially perpendicular to the modulating means.

In still another preferred embodiment, the present invention further comprises microlenses disposed between the microprisms and the modulating means. The microlenses are formed and positioned at the proper focal length so that the substantially collimated light emanating from each microprism is directed to a corresponding microlens. The light transmits through the microlenses and emerges as a substantially more collimated light source for the modulating means.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 8 is a perspective view of the alternate embodiment shown in FIG. 7;

FIG. 9 is a sectional view of a single microlens;

FIG. 10 is a cross-sectional view of a alternate embodiment of the present invention using two light sources;

FIG. 11 is a perspective view of the embodiment shown in FIG. 10;

FIG. 12 is an alternate embodiment of the embodiment shown in FIG. 10;

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

Figure 1:
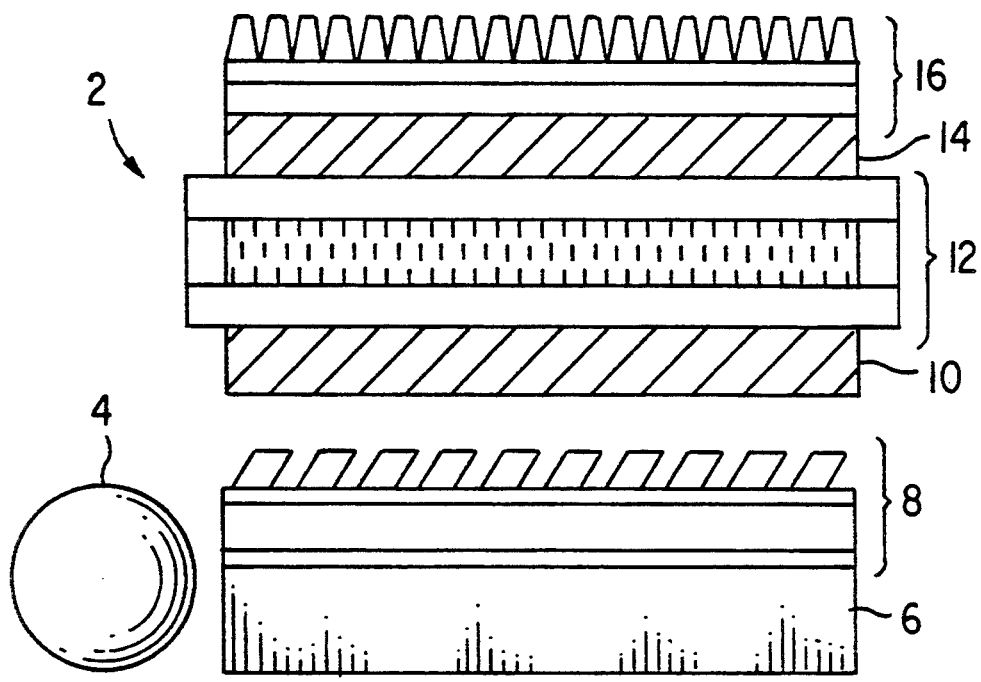
FIG. 1 is a cross-sectional view of an embodiment of a liquid crystal display constructed in accordance with the present invention.

One preferred application of the present invention is a backlighting means for a flat panel display, such as a liquid crystal display shown in FIG. 1, represented by the number 2. The display is composed of a light generating means 4, a slab waveguide 6 having a light accepting surface 7, a transparent reflecting means 8 in contact with slab waveguide 6, an optional input light polarizing means 10, a modulating means 12, an optional output light polarizing means 14 and a display means 16. It is understood that the representation of the present invention in FIG. 1 and throughout is for illustrative purposes only and is not meant to convey size or limit possible configurations of the microprisms.

The exact features of light generating means 4, modulating means 12, polarizing means 10 and 14 and display means 16 are not critical and can vary widely, and any such elements conventionally used in the art of flat-panel displays may be employed in the practice of this invention. Illustrative of useful light generating means 4 are lasers, fluorescent tubes, light emitting diodes, incandescent lights, sunlight and the like. Preferred modulating means 12 for use in the practice of this invention are liquid crystal cells. The liquid crystal material in liquid crystal cell 12 can vary widely and can be one of several types including, but not limited to, twisted nematic (TN) material, super-twisted nematic (STN) material and polymer dispersed liquid crystal (PDLC) material. Such liquid crystal material is arranged as known in the art in a matrix array of rows and columns. Exemplary of useful input light polarizing means 10 and output light polarizing means 14 are plastic sheet polaroid material and the like. The preferred display means 16 is the display means as disclosed in copending U.S. patent application Ser. No. 08/086,414, assigned to the assignee of the present application, the disclosure of which is incorporated herein by reference.

In FIG. 1, light generating means 4 is in close proximity to slab waveguide 6, and reflecting means 8 is in close proximity to polarizing means 10 which itself is in proximity to modulating means 12. As used herein, "proximity" means in intimate physical contact or closely positioned, preferably within about 1 inch, more preferably within about 0.75 inch, most preferably within about 0.5 inch, and within about 0.25 inch in the embodiments of choice, so that light does not have to be "projected" from one element to the next.

Figure 2:
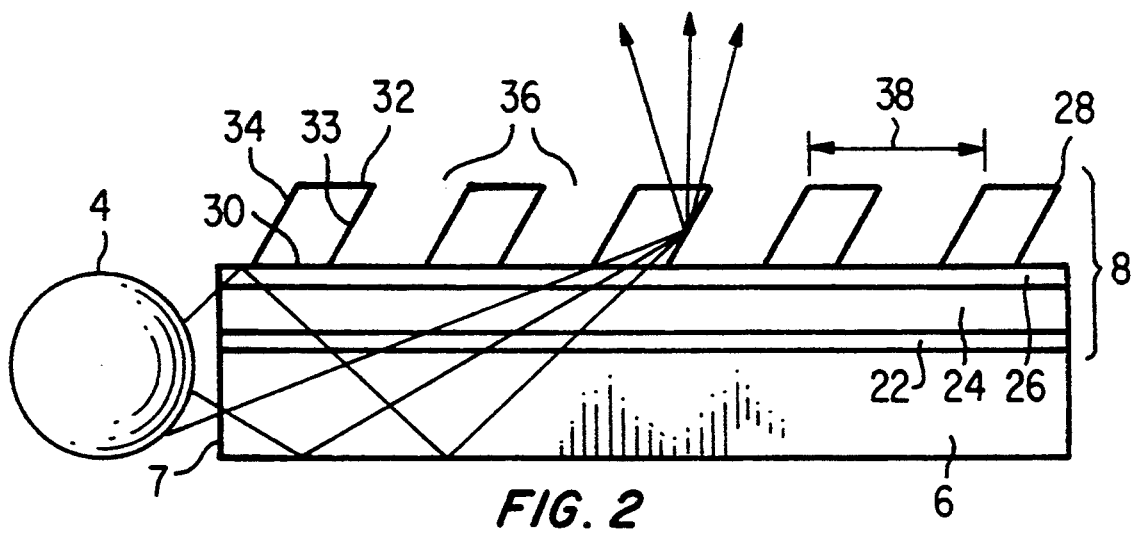
FIG. 2 is an exploded elevation view of one embodiment of the backlight assembly in accordance with the present invention.
Figure 3A:
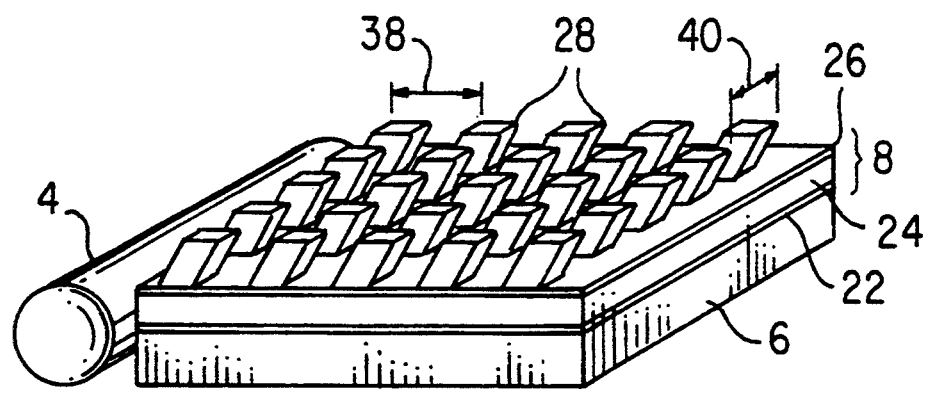
FIG. 3A is a perspective view of one embodiment of the present invention.

FIG. 2 shows an exploded view of slab waveguide 6 and the reflecting means 8. The slab waveguide 6 is made from any transparent material such as glass or polymer. The reflecting means 8 is composed of an adhesion promoting layer 22, a substrate 24, a second adhesion promoting layer 26 and an array of microprism waveguides 28. The microprisms 28 are constructed to form a six-sided geometrical shape having a light input surface 30 parallel with a light output surface 32 and sidewalls 33 and 34. Only sidewall 33 is effective in reflecting the light rays which are propagating through waveguide 6. Preferably, the intersection of sidewall 33 with substrate 24, or adhesion layer 26 thereon, forms a line that is perpendicular to the average direction of the light rays. For example, as shown in FIG. 3A, for a rectangular slab waveguide 6, the intersection of sidewall 33 with substrate 24 forms a line parallel to the light accepting surface 7 and is therefore perpendicular to the average direction of the light rays traveling through the slab waveguide 24. Although sidewall 34 is shown as parallel to sidewall 33, the orientation of side 34 is not critical. Microprisms 28 are separated by interstitial regions 36 that have a lower refractive index than the refractive index of the microprism 28. Light rays reflect through waveguide 6 via TIP, and enter each microprism 28 by way of light input surface 30, reflect off sidewall 33 and exit the microprism 28 through the light output surface 32 in a direction substantially perpendicular to the modulating means.

Slab waveguide 6 and substrate 24 are transparent to light within the wavelength range from about 400 to about 700 nm. In the preferred method of fabrication, as described below, the substrate 24 is also transparent to ultraviolet (UV) light in the range from about 250 to about 400 nm. This range allows the microprisms to be formed by photopolymerization of reactive monomers initiated by UV light. The index of refraction of both are equal or substantially equal and may range from about 1.45 to about 1.65. The most preferred index of refraction is from about 1.50 to about 1.60. The slab waveguide 6 and substrate 24 may be made from any transparent solid material. Preferred materials include transparent polymers, glass and fused silica. Desired characteristics of these materials include mechanical and optical stability at typical operation temperatures of the device. Most preferred materials are glass, acrylic, polycarbonate and polyester.

Microprisms 28 can be constructed from any transparent solid polymer material. Preferred materials have an index of refraction equal to or substantially equal to substrate 24 of between about 1.45 and about 1.65 and include polymethylmethacrylate, polycarbonate, polyester, polystryrene and polymers formed by photopolymerization of acrylate monomers. More preferred materials have an index of refraction between abut 1.50 and about 1.60 and include polymers formed by photopolymerization of acrylate monomer mixtures composed of urethane acrylates and methacrylates, ester acrylates and methacrylates, epoxy acrylates and methacrylates, (poly) ethylene glycol acrylates and methacrylates and vinyl containing organic monomers. Useful monomers include methyl methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diaerylate, diethyleneglycol diacrylate, diethylene glycol dimethacrylate, 1,6-hexanediol diacrylate, trimethylol propane triacrylate, pentaerythritol triacrylate and pentaerythritol tetra-acrylate. Especially useful are mixtures wherein at least one monomer is a multifunctional monomer such as diacrylate or triacrylate, as these will produce a network of crosslinks within the reacted photopolymer. The most preferred materials for use in the method of the invention are crosslinked polymers formed by photopolymerizing mixtures of ethoxylated bisphenol A diacrylate and trimethylol propane triacrylate. The index of refraction of the most preferred materials ranges from about 1.53 to about 1.56.

In order that modulating means 12 and display means 16 (FIG. 1) have high overall light output, it is preferred that the sum of the areas for all microprism waveguide input surfaces 30 be greater than 20 percent of the total area of substrate 24. It is more preferred that the sum of the areas for all microprism waveguide input surfaces 30 be greater than 35 percent of the total area of substrate 24. It is most preferred that the sum of the areas for all microprism waveguide input surfaces 30 be greater than 50 percent of the total area of substrate 24.

The index of refraction of interstitial regions 36 between the microprism waveguides 28 must be less than the index of refraction of the microprism waveguides 28. Preferred materials for interstitial regions include air, with an index of refraction of 1.00 and fluoropolymer materials with an index of refraction ranging from about 1.16 to about 1.35. The most preferred material is air.

The adhesion promoting layers 22 and 26 shown in FIG. 2 are an organic material that is light transmissive and that causes the waveguides 28, especially waveguides formed from polymers, as for example photocrosslinked acrylate monomer materials, to adhere strongly to the substrate 24. Such materials are well known to those skilled in the art. The thickness of adhesion promoting layers 22 and 26 is not critical and can vary widely. In the preferred embodiment of the invention, adhesion layers 22 and 26 are less than about 10 micrometers thick.

Figure 3B:
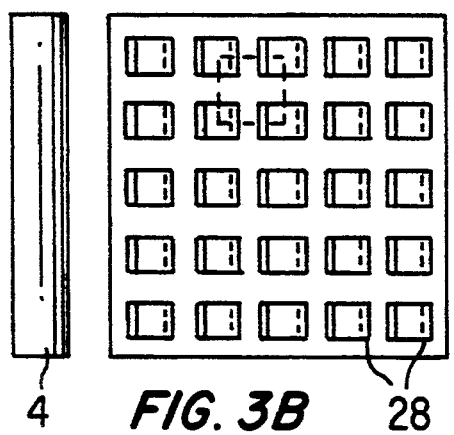
FIG. 3B is a plan view of a rectangular arrangement of the microprisms on the slab waveguide.
Figure 3C:
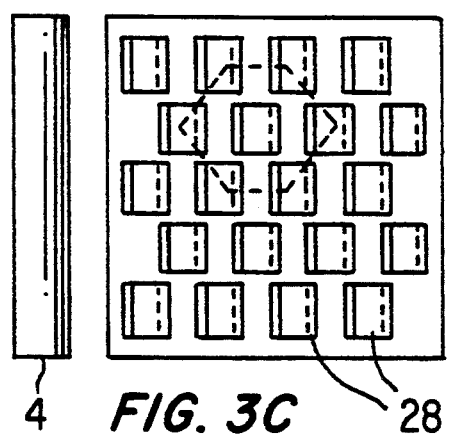
FIG. 3C is a plan view of a hexagonal arrangement of the microprisms on the slab waveguide.

FIG. 3A shows an exploded perspective view of light generating means 4, slab waveguide 6, substrate 24, adhesion promoting layers 22 and 26, and an array of microprisms 28. In this illustration, the microprisms 34 are arranged in a square or rectangular array, as shown in FIG. 3B, although other arrangements such as a hexagonal pattern are possible, as shown in FIG. 3C. The microprisms have a repeat distance 38 in the direction perpendicular to light generating means 4 and repeat distance 40 in the direction parallel to light generating means 4. Repeat distances 38 and 40 may be equal or unequal and may vary widely depending on the resolution and dimensions of the display. In addition, the repeat distances 38 and 40 may vary across the surface of the light reflecting means 8 in order to compensate for a lowering of the light intensity inside waveguide 6 as the distance from light generating means 4 increases. This lowering of the light intensity is due to light removal by the other microprisms of the array. Desired values of the repeat distances 38 and 40 range from about 10 microns to about 40 millimeters. More preferred values of the repeat distances 38 and 40 range from about 50 microns to about 10 millimeters. Most preferred values of the repeat distances 38 and 40 range from about 100 microns to about 2 millimeters.

Figure 3D:
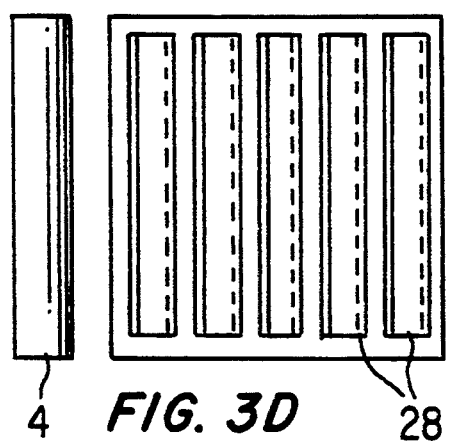
FIG. 3D is a plan view of a still further alternate arrangement of the microprisms on the slab waveguide.
Figure 4:
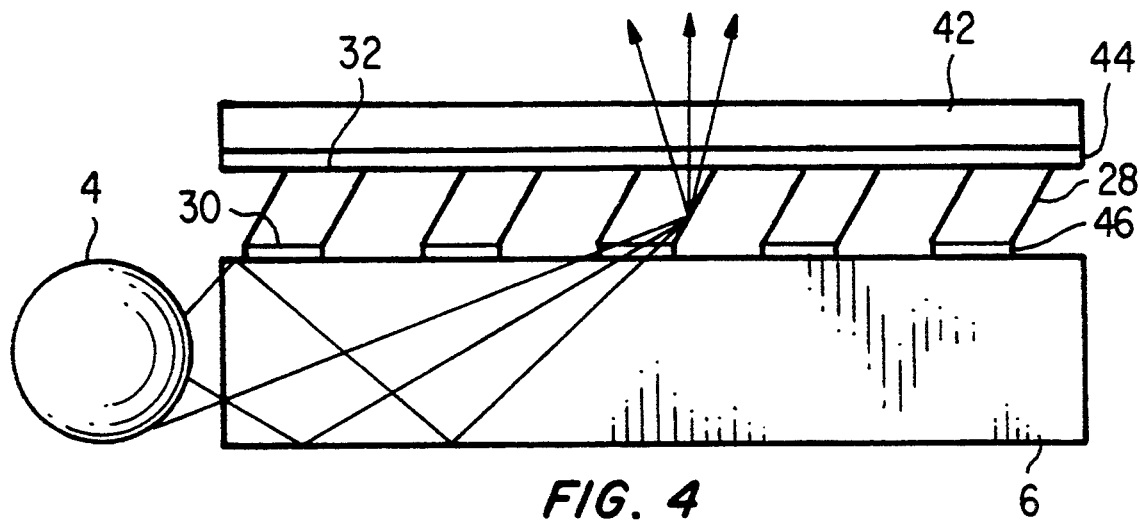
FIG. 4 is an exploded elevation view of an alternate embodiment of the present invention.

FIG. 4 illustrates an alternate embodiment of the present invention shown in FIGS. 2 and 3. The light input surface 30 of microprisms 28 is attached to slab waveguide 6 via an adhesion layer 46. Attached to the light output surface 32 is a substrate layer 42 via an adhesion layer 44.

Figure 5:
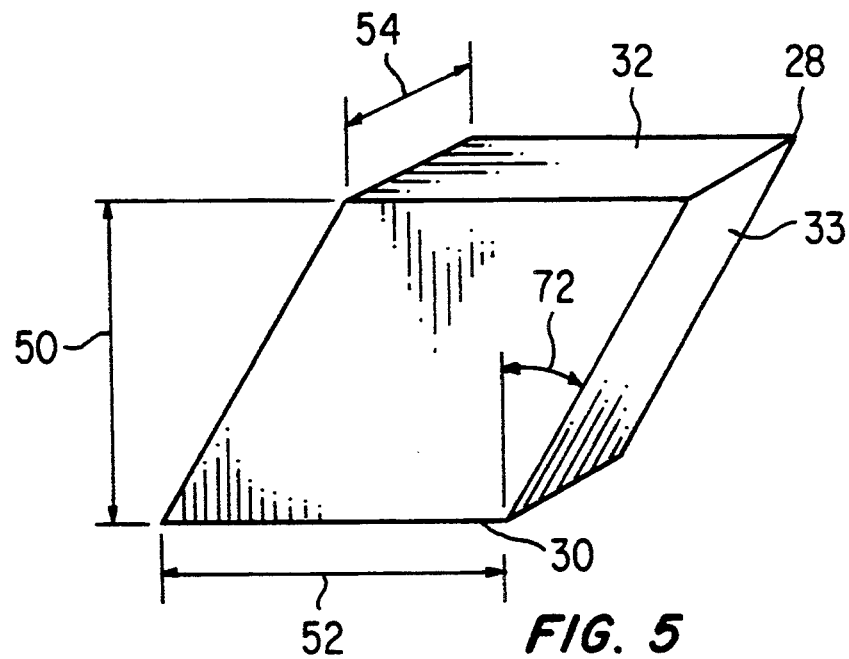
FIG. 5 is a perspective view of a single microprism.

A single microprism waveguide 28 is shown in FIG. 5. The desired values of tilt angle 72 range from about 25 degrees to about 40 degrees. More preferred values for tilt angle 72 range from about 28 degrees to about 37 degrees. Most preferred values for tilt angle 72 are from about 30 degrees to about 35 degrees. A method for estimating the desired value of tilt angle 72 is discussed below.

The height of microprism waveguide 28 in FIG. 5 has dimension 50. Height 50 may vary widely depending on the dimensions and resolution of the display. That is, smaller displays, such as laptop computer displays and avionics displays would have greatly reduced dimensions versus larger displays such as large screen, flat-panel televisions. Desired values of the dimension 50 range from about 10 microns to about 40 millimeters. More preferred values of the dimension 50 range from about 50 microns to about 10 millimeters. Most preferred values of dimension 50 range from about 100 microns to about 2 millimeters. The length of microprism waveguide 28 has dimension 52. Length 52 may vary widely depending on the dimensions and resolution of the display. In addition, the length 52 may vary across the surface of the light reflecting means 8 in order to compensate for a lowering of the light intensity inside waveguide 6 as the distance from light generating means 4 increases. This lowering of the light intensity is due to light removal by the other microprisms of the array. The maximum value for the length 52 is less than the repeat distance 38. Desired values of the dimension 52 range from about 10 microns to less than about 40 millimeters. More preferred values of the dimension 52 range from about 50 microns to less than about 10 millimeters. Most preferred values of dimension 52 range from about 100 microns to less than about 2 millimeters. The width of microprism 28 has dimension 54. Width 54 may vary widely depending on the dimensions and resolution of the display. In addition, the width 54 may vary across the surface of the light reflecting means 8 in order to compensate for a lowering of the light intensity inside waveguide 6 as the distance from light generating means 4 increases. This lowering of the light intensity is due to light removal by the other microprisms of the array. The maximum value for the width 54 is the repeat distance 40. That is, when width 54 equals repeat distance 40, the microprisms are contiguous across the substrate width as shown in FIG. 3D. Desired values of the dimension 54 range from about 10 microns to about 40 millimeters. More preferred values of the dimension 54 range from about 50 microns to about 10 millimeters. Most preferred values of dimension 54 range from about 100 microns to about 2 millimeters.

Figure 6:
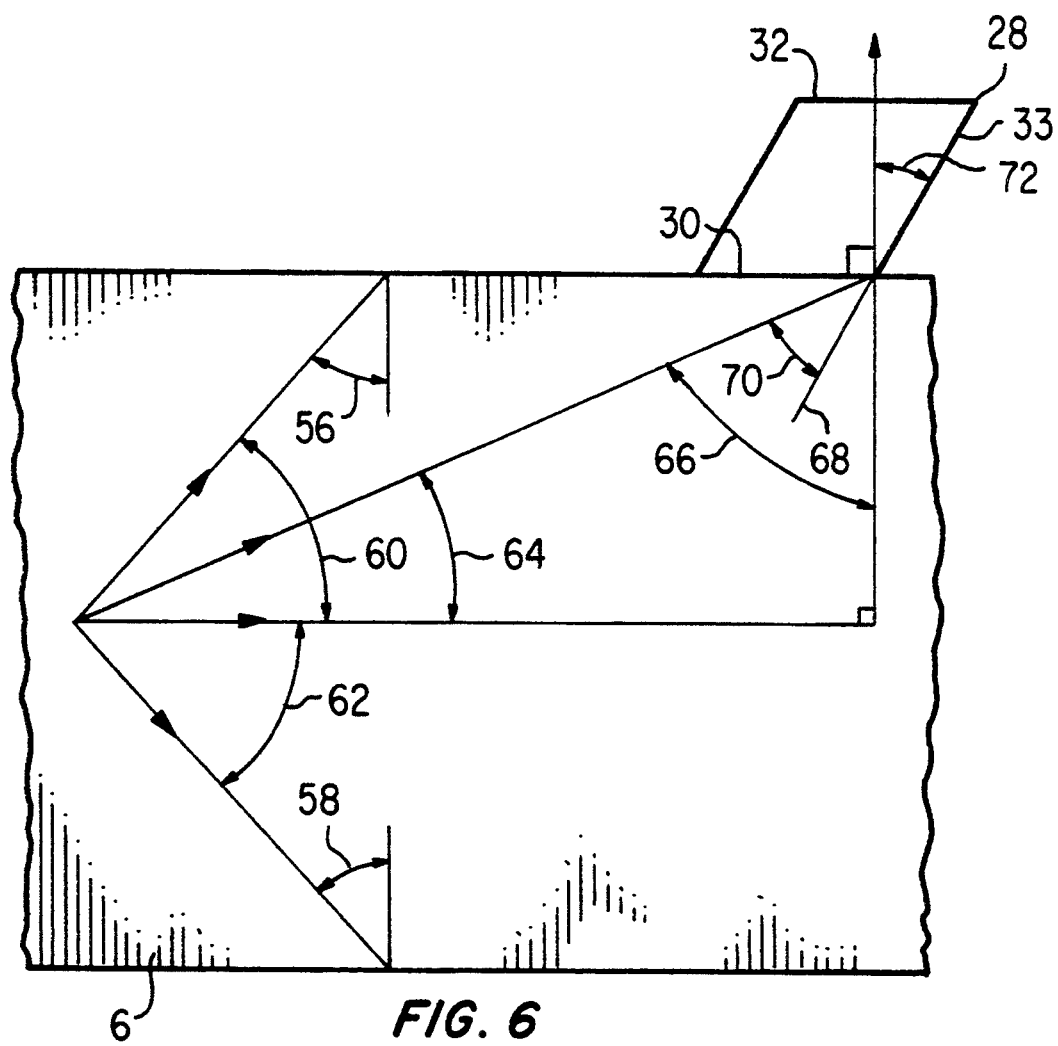
FIG. 6 is an exploded view of a single microprism on a slab waveguide illustrating directions of light rays traveling through the slab waveguide.

A method for approximately determining angle 72 of microprism 28 is shown in FIG. 6. We will assume for simplicity that the index of refraction of microprism 28 is equal to the index of refraction of slab waveguide 6. Snell's Law determines the angular spread of the light propagating in waveguide 6. If angles 56 and 58 are equal to the critical angle, $\theta_c$, for waveguide 6 as calculated from Snell's Law, then the total angular spread for light which can propagate in waveguide 6 is the sum of angles 60 and 62 where angles 60 and 62 are each equal to $90° - \theta_c$. Only 50 percent of the light, the light rays with propagation angles ranging from approximately zero (parallel to the plane of the slab waveguide) up to angle 60, have a chance of being removed from the slab waveguide by encountering the light input surface 30 of microprism 28. Light rays with angles from approximately zero to angle 62 will be reflected off the bottom surface of waveguide 6 by total internal reflection and will then be directed toward the top surface of waveguide 6 where they have a chance of being removed from waveguide 6 by other microprisms 28 farther down the waveguide.

For optimum functioning of microprism 28, surface 33 should be at angle 72 such that the midpoint of the light distribution represented by angle 60 will be directed through output surface 32 of microprism 28 at an angle perpendicular to the plane of waveguide 6. The midpoint of angle 60 is angle 64 which can be expressed as either $(90° - \theta_c)/2$ or $(45° - \theta_c/2)$. Angle 66 is then equal to $(90°-\text{angle } 64)$ or $45 + \theta_c/2$. The proper directionality for light in microprism 28 will occur if angle 72 equals angle 70 which in turn equals one-half of angle 66. As a result, angle 72 equals $22.5° + \theta_c/4$. For example, if the index of refraction of the waveguide 6 and microprism 28 is 1.55 and the waveguide and microprism are surrounded by air with an index of refraction of 1.00, then $\theta_c = 40°$ and angle 72 is 32.5°.

Figure 7:
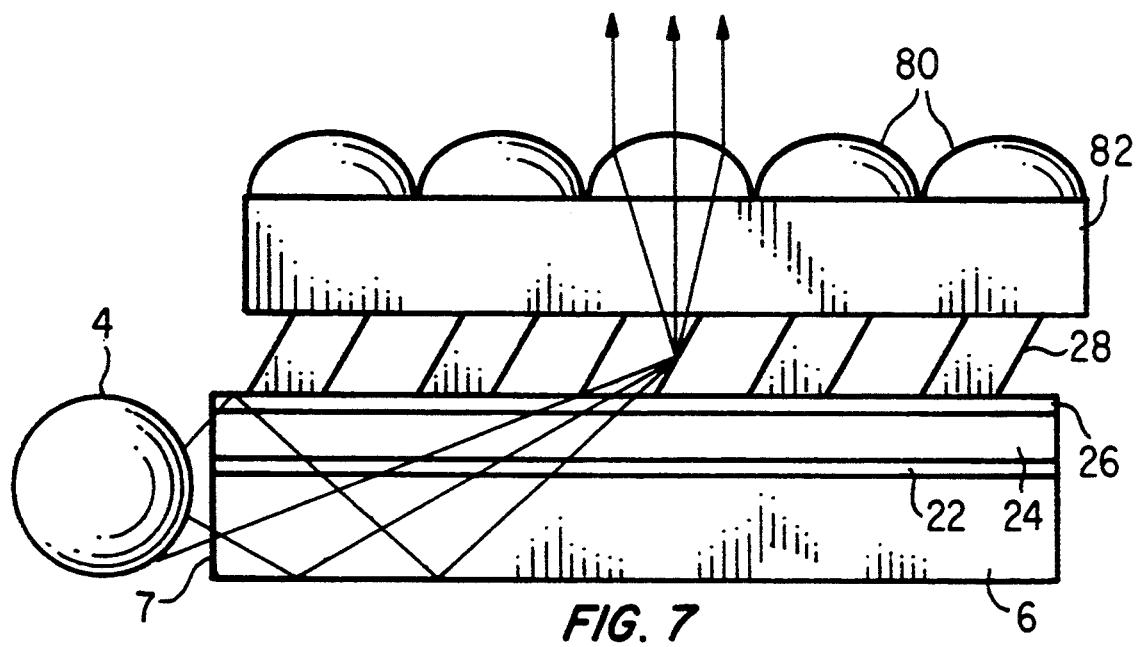
FIG. 7 is a cross-sectional view of a alternate embodiment of the reflecting means having an array of microlenses.

A further embodiment of the present invention is illustrated in FIGS. 7 and 8. Reflecting means 8 further comprises an array of microlenses 80. In this embodiment, the microlenses 80 are disposed between and in close proximity to the microprisms 28 and modulating means 12 (not shown). The microlenses 80 are preferably made from the same monomers as those previously disclosed for the microprisms 28 and have a index of refraction equal to or substantially equal to the index of refraction of the microprisms 28. However, any transparent material may be used, as for example, those materials previously discussed.

In FIG. 7, the substrate 82 for the microlenses 80 also serves as a spacer between the microlenses 80 and the microprisms 28. The thickness of substrate 82 is optimized to cause light from microprisms 28 to be collimated by microlenses 80. Substrate 82 may be made from any transparent solid material. Preferred materials include transparent polymers, glass and fused silica. Desired characteristics of these materials include mechanical and optical stability at typical operation temperatures of the device. Most preferred materials are glass, acrylic, polycarbonate and polyester.

An exploded perspective view of the microprism array and the microlens array 80 is shown in FIG. 8. The microlens array is shown as a square or rectangular array although other arrangements such as a hexagonal pattern are possible. The center-to-center distance between microlenses directly correlates to the repeat distances 38 and 40 of the microprisms 28. That is, for every microprism 28 there exists a corresponding microlens 80 that aligns with the output surface 32 of each microprism 28. In operation, the substantially collimated light rays emanating from the microprisms 28 are further collimated by the microlenses 80 to provide a more substantially collimated light source for modulating means 12.

A single microlens 80 is shown in FIG. 9. The microlens can be either a spherical lens or an aspherical lens. The width 86 of microlens 80 can vary from about 20 microns to 80 millimeters. More preferred values of the width 86 range from about 100 microns to about 20 millimeters. Most preferred values of the width 86 can range from about 200 microns to about 4 millimeters. The desired values of height 88 range from about 0.05 times the width 86 to about 3.0 times the width 86. More preferred values for the height 88 range from about 0.1 times the width 86 to about 2.0 times the width 86. Most preferred values for the height 88 range from about 0.2 times the width 86 to about 1.0 times the width 86. If microlens 80 is a spherical lens, the lens will have one curved surface having a radius of curvature 84. The radius of curvature can vary widely depending on the repeat distances 38 and 40 of the corresponding microprism array. Preferred values for the radius of curvature range from about 10 microns to about 80 millimeters. More preferred values for the radius of curvature 84 range from about 50 microns to about 20 millimeters. Most preferred values for the radius of curvature 84 range from about 100 microns to about 4 millimeters. In order that microlens 80 collect substantially all of the light directed out of waveguide 6 by microprism 28, the f-number of microlens 80 should be relatively small. The f-number values for microlens 80 can range from about 0.5 to about 4.0. More preferred values for the f-number range from about 0.6 to about 3.0. Most preferred values for the f-number range from about 0.7 to about 2.0.

Another alternate embodiment of the invention is shown in FIGS. 10 and 11. In this preferred embodiment two light generating means 4 and 4A are positioned adjacent to two oppositely disposed light accepting surfaces 7 and 7A of the slab waveguide 6. An array of microprisms 90 are attached to the slab waveguide 6 in a similar manner disclosed above. The microprisms 90 comprise a light input surface 92 parallel to a light output surface 94 wherein the light output surface 94 is larger in surface area than the light input surface 92. Microprism 90 also comprises two oppositely disposed tilted sidewalls 96 and 98. Sidewalls 96 and 98 are each formed at an angle to the normal of the surface of slab waveguide 6. The intersection of each tilted sidewall with the planar substrate 24, or adhesion layer 26 thereon, is parallel to the oppositely disposed light acccepting surfaces 7 and 7A and therefore, perpendicular to the average direction of the light rays traveling through the slab waveguide 6. The relationship of the optimum tilt angle to the propagation angle of light within the slab waveguide 6 is the same as described in FIG. 6. Each microprism 90 captures light rays traveling in two opposite directions along the slab waveguide 6. The light emerges from the microprisms 90 as a substantially collimated light source for the modulating means 12. The preferred materials of microprisms 90 are the same as those disclosed for microprism 28.

In order that modulating means 12 and display means 16 (FIG. 1) have high overall light output, it is preferred that the sum of the areas for all microprism 90 input surfaces 92 be greater than 20 percent of the total area of substrate 24. It is more preferred that the sum of the areas for all microprism 90 input surfaces 92 be greater than 35 percent of the substrate 24. It is most preferred that the sum of the areas for all microprism 90 input surfaces 92 be greater than 50 percent of the total area of substrate 24.

FIG. 12 illustrates an alternate embodiment of the present invention shown in FIGS. 10 and 11. The light input surface 92 of microprisms 90 is attached to slab waveguide 6 via an adhesion layer 114. Attached to the light output surface 94 is a substrate layer 110 via an adhesion layer 112.

Figure 13:
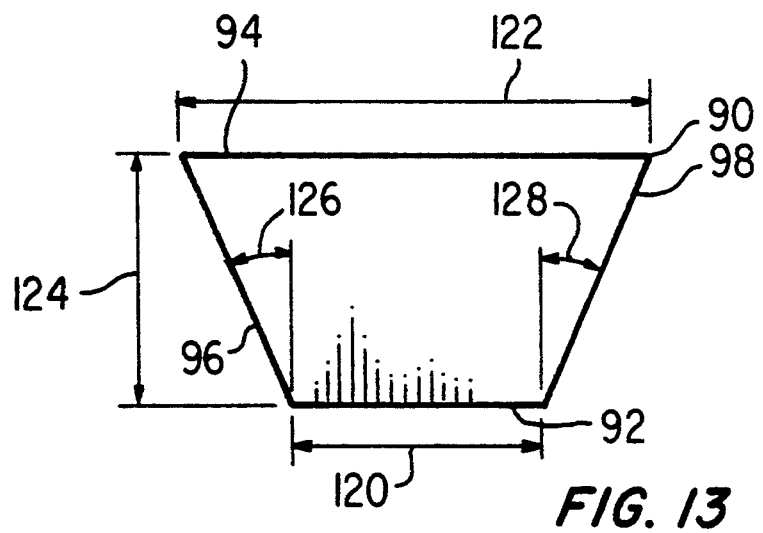
FIG. 13 is a sectional view of a single microprism having two angled sides.

A single microprism waveguide 90 is shown in FIG. 13. The desired values of tilt angles 126 and 128 range from about 25 degrees to about 40 degrees. More preferred values for tilt angles 126 and 128 range from about 28 degrees to about 37 degrees. Most preferred values for tilt angles 126 and 128 are from about 30 degrees to about 35 degrees. Tilt angles 126 and 128 are approximated using the same method as previously disclosed for tilt angle 72.

The height of microprism 90 has dimension 124. Height 124 may vary widely depending on the dimensions and resolution of the display. Desired values of the dimension 124 range from about 10 microns to about 40 millimeters. More preferred values of the dimension 124 range from about 50 microns to about 10 millimeters. Most preferred values of dimension 124 range from about 100 microns to about 2 millimeters. The length of microprism waveguide 90 has dimensions 120 and 122. Length 122 is a function of length 120 and tilt angles 126 and 128. Length 120 may vary widely depending on the dimensions and resolution of the display. In addition, the length 120 may vary across the surface of the light reflecting means 8 in order to compensate for a lowering of the light intensity inside waveguide 6 as the distance from light generating means 4 and 4A increases. This lowering of the light intensity is due to light removal by the other microprisms of the array. The maximum value for the length 120 is less than the repeat distance 100 shown in FIG. 11. Desired values of the dimension 120 range from about 10 microns to less than about 40 millimeters. More preferred values of the dimension 120 range from about 50 microns to less than about 10 millimeters. Most preferred values of dimension 120 range from about 100 microns to less than about 2 millimeters. The width of microprism 28 has dimension 121 (not shown). Width 121 may vary widely depending on the dimensions and resolution of the display. In addition, the width 121 may vary across the surface of the light reflecting means means 8 in order to compensate for a lowering of the light intensity inside waveguide 6 as the distance from light generating means 4 and 4A increases. This lowering of the light intensity is due to light removal by the other microprisms of the array. The maximum value for the width 121 is the repeat distance 102 shown in FIG. 11. That is, when width 121 equals repeat distance 102, the microprisms are contiguous across the substrate width as illustrated in FIG. 3D. Desired values of the dimension 121 range from about 10 microns to about 40 millimeters. More preferred values of the dimension 121 range from about 50 microns to about 10 millimeters. Most preferred values of dimension 121 range from about 100 microns to about 2 millimeters.

A further embodiment of the invention disclosed in FIGS. 10 and 11 further comprises an array of microlenses 80 as previously disclosed. In this embodiment, the microlenses 80 are disposed between the microprisms 90 and modulating means 12. Microlenses 80 attach to a substrate 82 that is made from the same substrate material as disclosed for substrate 24. The thickness of substrate 82 is optimized to cause light from microprisms 90 to be collimated by microlenses 80. The center-to-center distance between microlenses directly correlates to the repeat distances 100 and 102 of the microprisms 90. That is, for every microprism 90 there exists a corresponding microlens 80 that aligns with the output surface 94 of each microprism 90. The substantially collimated light rays emanating from the microprisms 90 are further collimated by the microlenses 80 to provide a more substantially collimated light pattern.

Figure 14:
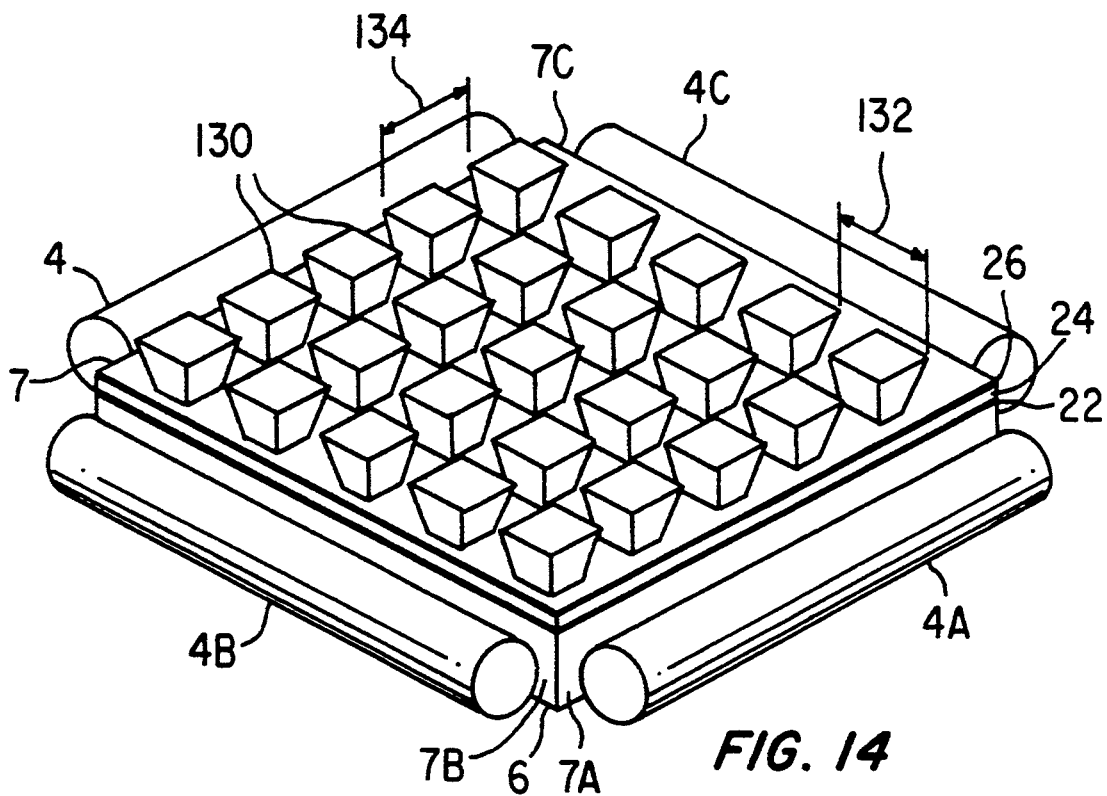
FIG. 14 is a perspective view of a alternate embodiment of the present invention using four light sources.
Figure 15:
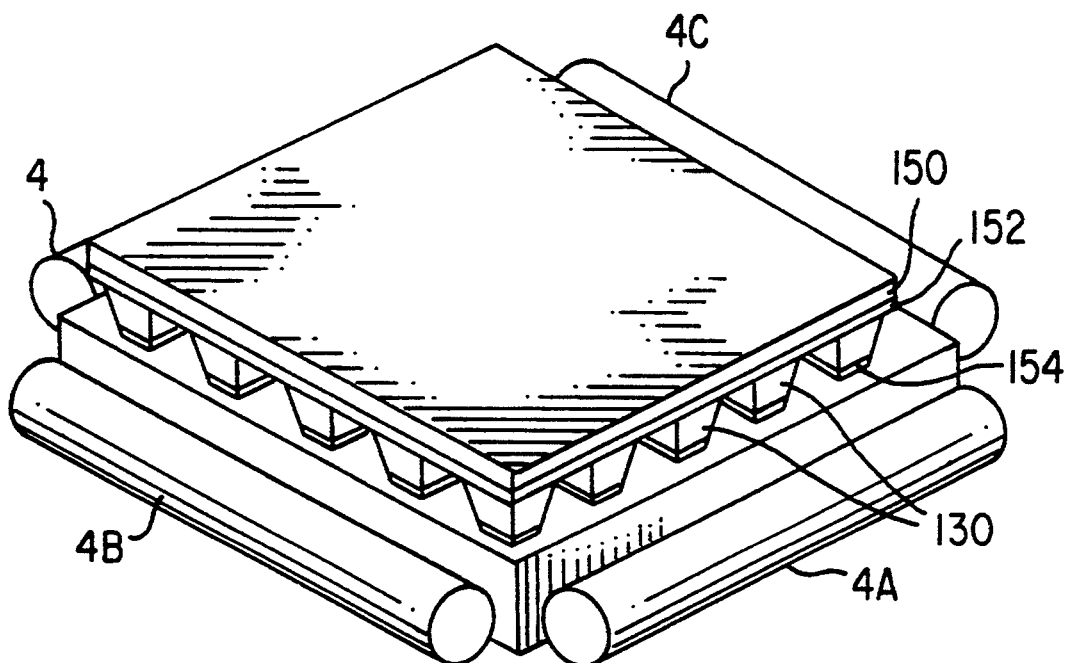
FIG. 15 is an alternate embodiment of the embodiment shown in FIG. 14.
Figure 16:
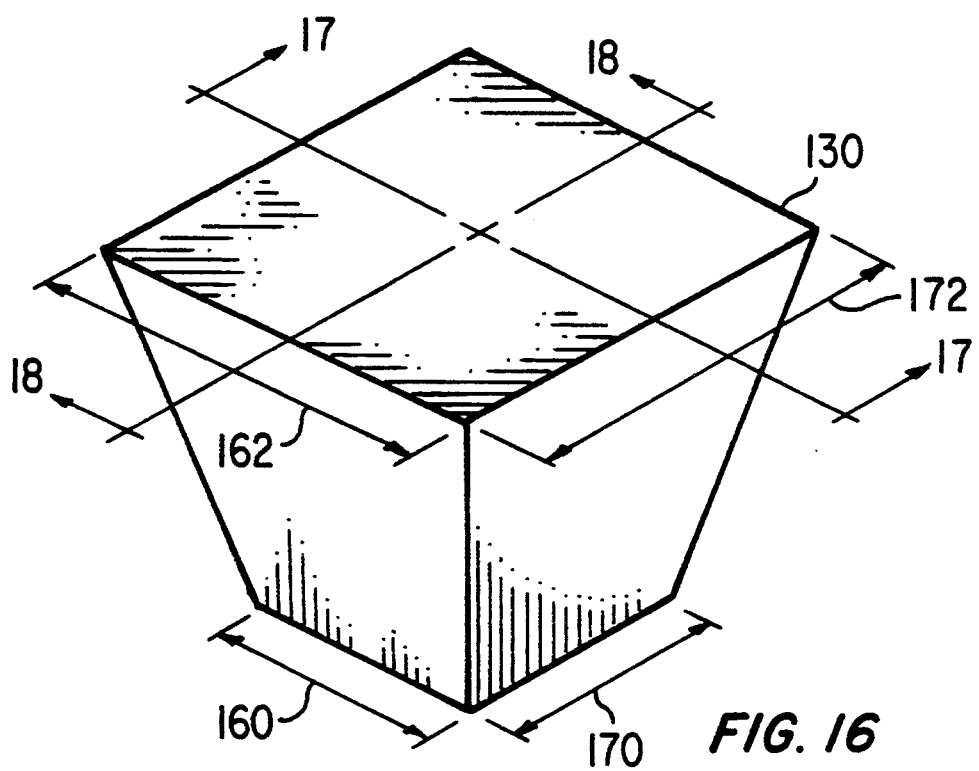
FIG. 16 is a perspective view of a single microprism having four angled sides.
Figure 17:
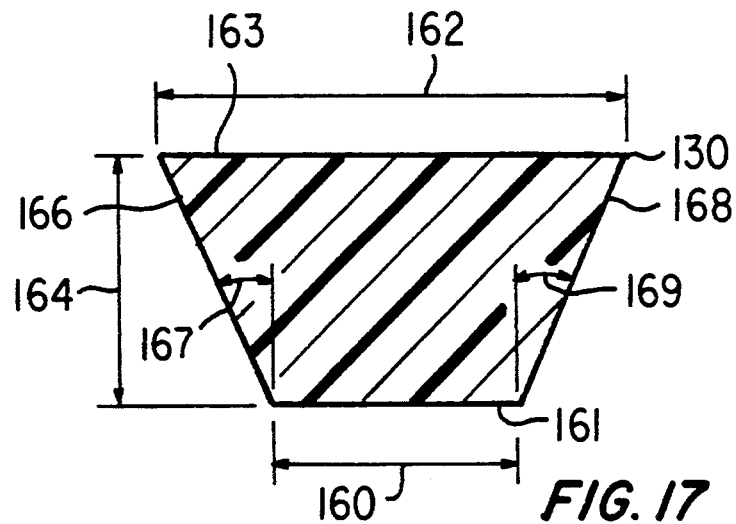
FIG. 17 is a sectional view of a single microprism shown in FIG. 16.
Figure 18:
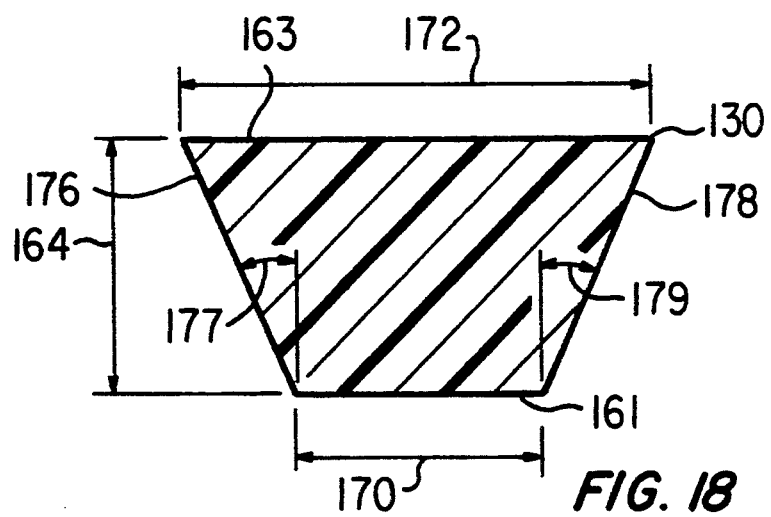
FIG. 18 is another sectional view of a single microprism shown in FIG. 16.

A still further embodiment of the present invention is shown in FIG. 14, and FIG. 15 illustrates an alternate embodiment of the invention shown in FIG. 14. In these preferred embodiments four light generating means 4, 4A, 4B and 4C are positioned adjacent to each one of four light accepting surfaces 7, 7A, 7B and 7C of the slab waveguide 6. An array of microprisms 130 is attached to the slab waveguide 6 in a similar manner to that disclosed above. A perspective view of a single microprism waveguide 130 is shown in FIG. 16. FIG. 17 is a cross-sectional view of prism 130 along plane 17, shown in FIG. 16, and FIG. 18 is a cross-sectional view of prism 130 along plane 18 shown in FIG. 16. As shown in FIGS. 17 and 18, the microprisms 130 comprise a light input surface 161 parallel to a light output surface 163 wherein the light output surface 163 is larger in surface area than the light input surface 161. Microprisms 130 also comprise four tilted sidewalls 166, 168, 176 and 178. The tilted sidewalls are positioned so that the line formed by the intersection of the tilted sidewall and the slab waveguide 6 is parallel to two of the light accepting surfaces and perpendicular to the average direction of the light rays traveling through the slab waveguide 6 from those two light accepting surfaces. Each microprism 130 captures light rays traveling in the four directions within the slab waveguide and transmits the light via TIR to the light output surface 163. The light from the four light generating means emerges from the microprisms 130 as a substantially collimated light source for the modulating means 12. The desired values for height 164, lengths 160, 162, 170 and 172, tilt angles 167, 169, 177 and 179 and repeat dimensions 134 and 132 are the same as those disclosed for the previous embodiments.

In FIG. 15, the light input surface 161 of microprism 130 is attached to slab waveguide 6 via an adhesion layer 154. Attached to the light output surface 163 is a substrate layer 150 via an adhesion layer 152.

A further embodiment of the invention disclosed in FIGS. 14 and 15 further comprises an array of microlenses 80. In this embodiment, the microlenses 80 are disposed between the microprisms 130 and modulating means 12. Microlenses 80 attach to a substrate 82 that is made from the same substrate material as disclosed for substrate 24. The thickness of substrate 82 is optimized to cause light from microprisms 130 to be collimated by microlenses 80. The center-to-center distance between microlenses directly correlates to the repeat distances 134 and 132 of the microprisms 130. That is, for every microprism 130 there exists a corresponding microlens 80 that aligns with the output surface 163 of each microprism 130. The substantially collimated light rays emanating from the microprisms 130 are further collimated by the microlenses 80 to provide a more substantially collimated light pattern.

Arrays of microprisms 28 and microlenses 80 can be manufactured by a variety of techniques including injection molding, compression molding, hot roller pressing casting, photopolymerization within a mold and photopolymerization processes which do not employ a mold. A preferred technique is the photopolymerization process as disclosed and illustrated in the aforementioned U.S. patent application incorporated by reference. Some simple modifications to that process are shown in FIG. 19.

Figure 19A:
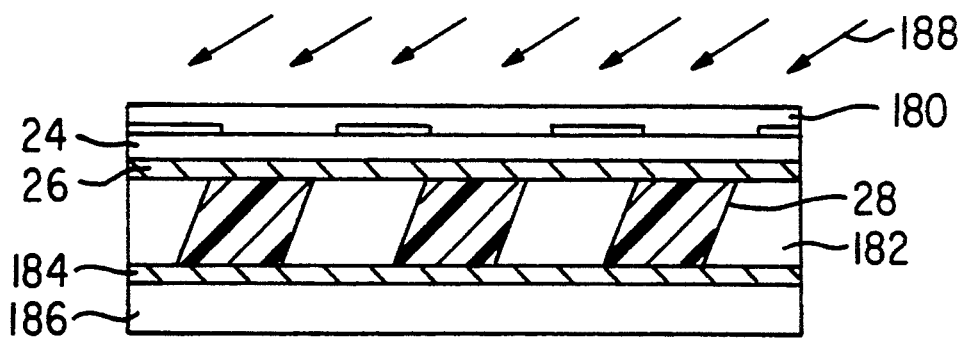
FIG. 19A illustrates a method for fabricating the embodiment of FIGS. 1–5.

FIG. 19A illustrates the process for producing microprisms 28 of the type shown in FIG. 5 in which side 33 of the microprism is tilted at angle 72. A photomask 180 is placed in substantial contact with a substrate 24 having an adhesion layer 26 wherein the photomask has opaque and transparent regions. A substantially uniform thickness of photopolymerizable mixture 182 comprising monomer and photoinitiator is placed between substrate 24 with adhesion layer 26 and backing plate 186 with release layer 184. The photopolymerizable mixture 182 is exposed to substantially collimated ultraviolet light 188 through the transparent regions of the photomask 180 for a time and under conditions sufficient to photopolymerize regions of the monomer mixture to form an array of microprisms 28. In order that microprisms 28 form with sidewalls having a tilt angle 72, the ultraviolet light must be incident on the photomask at an angle which can either be calculated using Snell's Law or determined experimentally. After exposure to ultraviolet light, photomask 180, backing plate 186 with release layer 184 and the unexposed photopolymerizable mixture 182 are removed leaving an array of microprisms 28 attached by adhesion layer 26 to substrate 24.

Figure 19B:
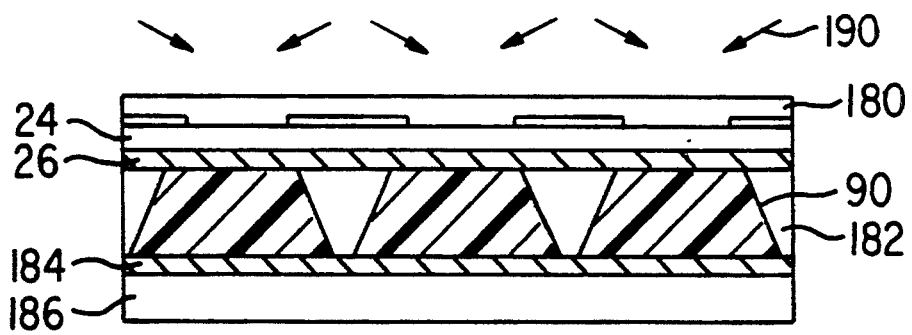
FIG. 19B illustrates a method for fabricating the embodiment of FIGS. 10–13.

FIG. 19B illustrates the process for producing microprisms 90 of the type shown in FIG. 13 in which side 96 of microprism 90 is tilted at angle 126 and side 98 of microprism 90 is tilted at angle 128. A photomask 180 is placed in substantial contact with a substrate 24 having an adhesion layer 26 wherein the photomask has opaque and transparent regions. A substantially uniform thickness of photopolymerizable mixture 182 comprising monomer and photoinitiator is placed between substrate 24 with adhesion layer 26 and backing plate 186 with release layer 184. The photopolymerizable mixture 182 is exposed to substantially collimated ultraviolet light 190 through the transparent regions of the photomask 180 for a time and under conditions sufficient to photopolymerize regions of the monomer mixture to form an array of microprisms 90. In order that microprisms 90 form with sidewalls having tilt angles 126 and 128, the ultraviolet light 190 must be incident on the photomask 180 from two different directions which can either be calculated by using Snell's Law or determined experimentally. The ultraviolet light exposure from two different directions can be done either simultaneously or sequentially. After exposure to ultraviolet light, photomask 180, backing plate 186 with release layer 184 and the unexposed photopolymerizable mixture 182 are removed leaving an array of microprisms 90 attached by adhesion layer 26 to substrate 24.

A process (not illustrated) similar to the one illustrated in FIG. 19B to form microprisms 90 with two tilted sidewalls can also be used to form microprisms 130 of the type illustrated in FIG. 16 which have four tilted sidewalls. If all four sidewalls are tilted, the ultraviolet light must pass through photomask 180 from four different directions, either simultaneously or sequentially. The four directions that are required for the ultraviolet light can be determined experimentally or calculated from Snell's Law.

Figure 19C:
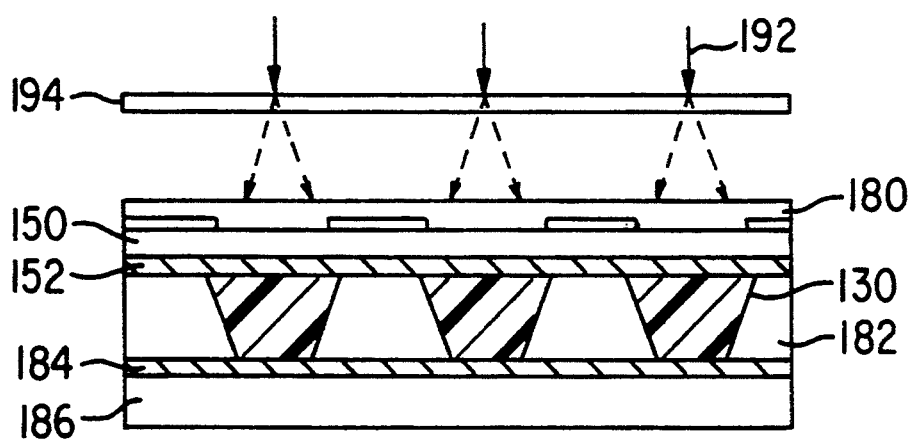
FIG. 19C illustrates a method for fabricating the embodiment of FIGS. 14–18.

FIG. 19C illustrates another process for producing microprisms 130 of the type shown in FIGS. 15 and 16 which have four tilted sidewalls. A photomask 180 is placed in substantial contact with a substrate 150 having an adhesion layer 152 wherein the photomask has opaque and transparent regions. A substantially uniform thickness of photopolymerizable mixture 182 comprising monomer and photoinitiator is placed between substrate 150 with adhesion layer 152 and backing plate 186 with release layer 184. The photoinitiator must be present in a sufficient amount to absorb a significant fraction of the ultraviolet light within the photopolymerizable mixture layer. A light diffuser 194 is placed between the photomask 180 and the source of ultraviolet light 192 which causes the ultraviolet light to be spread over a range of angles. In order that the type of microprisms 130 as shown in FIGS. 15 and 16 be formed, the diffuser should spread the light over a full angle (measured at the 50 percent intensity points) of approximately 20 degrees. The photopolymerizable mixture 182 is exposed to ultraviolet light 192 through diffuser 194 and through the transparent regions of the photomask 180 for a time and under conditions sufficient to photopolymerize regions of the monomer mixture to form an array of microprisms 130. Although the diffuser 194 causes the ultraviolet light to spread as it passes through the photopolymerizable mixture 182, surprisingly the prisms are formed with the large face in contact with adhesion layer 152 and the small face in contact with release layer 184. This surprising result is a consequence of the lower ultraviolet light intensity in the photopolymerizable layer 182 near the release layer 184 relative to the adhesion layer 152 due to the spreading of the light by the diffuser 194 and absorption of the ultraviolet light by the photoinitiator in the photopolymerizable mixture 182. The lower light intensity causes the photopolymerization process to be more easily quenched by oxygen which is present within the photopolymerizable mixture 182 and results in a slower photopolymerization process and a smaller microprism face adjacent to release layer 184. After exposure to ultraviolet light, photomask 180, backing plate 186 with release layer 184 and the unexposed photopolymerizable mixture 182 are removed leaving an array of microprisms 130 attached by adhesion layer 152 to substrate 150. The array of microprisms so formed can be attached to a suitable slab waveguide in the manner illustrated in FIG. 15.

A process similar to the one illustrated in FIG. 19C to form microprisms 130 with four tilted sidewalls can also be used to form microlenses 80 of the type illustrated in FIG. 9. In order to form microlenses, the photoinitiator must be present in a sufficient amount to absorb a significant fraction of the ultraviolet light within the photopolymerizable mixture layer. A light diffuser 194 is placed between the photomask 180 and the source of ultraviolet light 192 which causes the ultraviolet light to be spread over a range of angles. In order that the type of microlenses 80 as shown in FIG. 9 be formed, the diffuser should spread the light over a full angle (measured at the 50% intensity points) of approximately 40-100 degrees. The photopolymerizable mixture 182 is exposed to ultraviolet light 192 through diffuser 194 and through the transparent regions of the photomask 180 for a time and under conditions sufficient to photopolymerize regions of the monomer mixture to form an array of microlenses 80. The ultraviolet light is turned off before the photopolymerized region touches the release layer 184. By controlling the angular spread of light passing through diffuser 194 and by controlling the thickness of the substrate layer 150, either spherical microlenses or aspherical microlenses can be formed.

This invention can be used for those applications for which backlighting is required. Illustrative of such applications are computer terminals, televisions, aircraft cockpit displays, automotive instrument panels, other devices that provide text, graphics or video information and other light transmitting applications that require a low profile means for collimating a light source.

The following specific examples are presented to particularly illustrate the invention and should not be construed to place limitations thereon.

EXAMPLE 1

Microprisms with 0.025"×0.025 " square bases and two sides in the approximate shape of parallelograms as illustrated in FIGS. 1-5 were formed on 0.004" thick polyester film using the method illustrated in FIG. 19A. The photomask was a 5"×5" glass mask with 0.025"×0.025" square transparent regions arranged in a square pattern and separated by 0.025" black lines. The center-to-center distance between adjacent open squares was 0.050". The microprism substate was a 0.004" thick Hostaphan 4500 polyester film produced by Hoechst Celanese. The Hostaphan 4500 film was coated on both sides with a solvent adhesion layer. The substrate was placed in intimate contact with the mask by placing a few milliliters of methanol between the mask and the substrate film and pressing the two pieces together with a rubber roller. The backing plate used during the exposure was a 0.25" thick glass plate coated with a thin film of Rain-X, a commercially available material. The backing plate was placed on a horizontal surface and approximately five milliliters of the liquid photopolymerizable mixture was pipetted onto the center of the plate. The photopolymerizable mixture consisted of approximately 65.1% ethoxylated bisphenol A diacrylate, 32.6% trimethylolpropane triacrylate; 0.3% pentaerythritol tetrabis(3,5-di-tert-butyl-4-hydroxyphenyl) (tradename Irganox 1010) antioxidant, 0.67% α,α-dimethyloxy-α-hydroxy acetophenone (Darocur 1173) photoinitiator, 0.67% benzidimethyl ketal (Irgacure 651) photoinitiator and 0.67% Irgacure 500 photoinitiator. The total percentage of photoinitiators was 2.0%. Metal spacers, 4"×0.5"×0.016" thick, were placed around the edges of the backing plate. The photomask/substrate assembly was placed, substrate side down, on top of the photopolymerizable mixture. A clear glass 5"×5"×0.25" thick plate was placed on top of this entire fabrication assembly and metal clamps and screws were used to fully and evenly compress the plates together resulting in a 0.016" thick photopolymerizable layer between the backing plate and the substrate polyester film.

The entire fabrication assembly was tilted at an angle of approximately 60° with respect to a horizontal surface and was placed under the collimating lens of an ultraviolet (UV) radiation exposure system. The UV system contained a 1000 Watt mercury-xenon arc lamp and delivered uniform, substantially collimated, 280-350 nm light with an intensity of approximately 70 mW/cm² to the entire 5"×5" tilted fabrication assembly. The sample was irradiated for 8 seconds. The fabrication assembly was then dissassembled and the array film with the microprisms now formed, but still covered with unreacted photopolymerizable material in the interstitial regions between the microprisms, was placed in a stirred bath of isopropanol and left for ten minutes. After removal of the residual monomer, the microprisms were dried in a stream of nitrogen gas, placed in a nitrogen gas-purged enclosure with a quartz window, and hard cured under the UV radiation for an additional 20 seconds.

Optical microscopy was used to evaluate the microprisms. The individual microprisms had six faces, four side faces and a top and bottom face. Two of the side faces, on opposite sides of the microprisms, were observed to have approximately the shape of parallelograms. The top and bottom faces of the microprisms were approximately squares with dimensions of 0.025"×0.025". The height of the prisms was approximately 0.016", the thickness of the metal spacers used in the fabrication assembly. The edges of the two side faces of the microprisms that were in the shape of parallelograms formed angles of approximately 30° with respect to an imaginary line drawn perpendicular to the surface of the substrate. The microprisms were separated by a distance of approximately 0.025".

To test the operation of the microprisms, the array of microprisms on the polyester substrate was placed on a slab of clear acrylic plastic with approximate dimensions of 12"×6"×0.25" thick. A thin film of water was placed between the polyester substrate and the acrylic slab so that light could easily couple between the slab and the substrate of the microprism array. Light from a 1 Watt fluorescent bulb was coupled into one of the 0.25" thick sides of the acrylic slab. The array of microprisms on the polyester substrate was turned sequentially so that each of the 4 sides of the microprisms was facing the fluorescent lamp. In one of the four orientations, the orientation shown in FIG. 2, light from the slab was coupled out of the tops of the microprisms in a range of directions covering an angular distribution of approximately 50°, measured as the full width of the angular distribution at the 50% intensity points. The center of the light distribution coming from the microprisms was in a direction approximately perpendicular to the surface of the slab. Alternatively the light distribution could be described as extending ±25° either side of an imaginary line drawn perpendicular to the plane of the substrate. In the other three orientations of the microprisms, very little light was observed being emitted in the direction perpendicular the surface of the slab.

EXAMPLE II

Microprisms with 35 micron by 35 micron square bases and two sides in the shape of parallelograms as illustrated in FIGS. 1-5 were formed on 0.002" thick polyester film using the method illustrated in FIG. 19A and Example I. The photomask was a 5"×5" glass mask with 35 micron by 35 micron square transparent regions arranged in a square pattern and separated by 15 micron black lines. The center-to-center distance between adjacent open squares was 50 microns. The microprism substate was a 0.002" thick Hostaphan 4500 polyester film produced by Hoechst Celanese. The backing plate was placed on a horizontal surface and approximately one milliliter of the liquid photopolymerizable mixture was pipetted onto the center of the plate. The photopolymerizable mixture consisted of approximately 65.1% ethoxylated bisphenol A diacrylate, 32.6% trimethylolpropane triacrylate; 0.3% pentaerythritol tetrabis(3,5-di-tert-butyl-4-hydroxyphenyl) (tradename Irganox 1010) antioxidant, 0.67% $\alpha,\alpha$-dimethyloxy-$\alpha$-hydroxy acetophenone (Darocur 1173) photoinitiator, 0.67% benzidimethyl ketal (Irgacure 651) photoinitiator and 0.67% Irgacure 500 photoinitiator. The total percentage of photoinitiators was 2.0%. Two metal wire spacers, 25 microns in diameter, were placed along two edges of the backing plate. The photomask/substrate assembly was placed, substrate side down, on top of the photopolymerizable mixture. A clear glass 5"×5"×0.25" thick plate was placed on top of this entire fabrication assembly and metal clamps and screws were used to fully and evenly compress the plates together resulting in an approximately 25 micron thick photopolymerizable layer between the backing plate and the substrate polyester film.

The entire fabrication assembly was tilted at an angle of approximately 60° with respect to a horizontal surface and was placed under the collimating lens of a UV radiation exposure system as described in Example I. The sample was irradiated for 4 seconds. The fabrication assembly was then dissassembled and the array film with the microprisms now formed, but still covered with unreacted photopolymerizable material in the interstitial regions between the microprisms, was placed in a stirred bath of isopropanol and left for ten minutes. After removal of the residual monomer, the microprisms were dried in a stream of nitrogen gas, placed in a nitrogen gas-purged enclosure with a quartz window, and hard cured under the UV radiation for an additional 20 seconds.

Optical microscopy was used to evaluate the microprisms. The individual microprisms had six faces, four side faces and a top and bottom face. Two of the side faces, on opposite sides of the microprisms, were observed to have approximately the shape of parallelograms. The top and bottom faces of the microprisms were approximately squares with dimensions of 35 microns by 35 microns. The height of the prisms was approximately 30 microns, slightly larger than the thickness of the metal wire spacers used in the fabrication assembly. The edges of the two side faces of the microprisms that were in the shape of parallelograms formed angles of approximately 30° with respect to an imaginary line drawn perpendicular the surface of the substrate. The microprisms were separated by a distance of approximately 15 microns.

To test the operation of the microprisms, the array of microprisms on the polyester substrate was placed on a slab of clear acrylic plastic with approximate dimensions of 12"×6"×0.25" thick. A thin film of water was placed between the polyester substrate and the acrylic slab so that light could easily couple between the slab and the substrate of the microprism array. Light from a 1 Watt fluorescent bulb was coupled into one of the 0.25" thick sides of the acrylic slab. The array of microprisms on the polyester substrate was turned sequentially so that each of the four sides of the microprisms was facing the fluorescent lamp. In one of the four orientations, the orientation shown in FIG. 2, light from the slab was coupled out of the tops of the microprisms in a range of directions covering an angular distribution of approximately 50°, measured as the full width of the angular distribution at the 50% intensity points. The center of the light distribution coming from the microprisms was in a direction approximately perpendicular to the surface of the slab. Alternatively the light distribution could be described as extending ±25° either side of an imaginary line drawn perpendicular to the plane of the substrate. In the other three orientations of the microprisms, very little light was observed being emitted in the direction perpendicular the surface of the slab.

EXAMPLE III

Microprisms with 0.025"×0.025" square bases and two sides in the shape of trapezoids as illustrated in FIGS. 10–13 were formed on 0.004" thick polyester film using the method illustrated in FIG. 19B. The photomask was a 5"×5" glass mask with 0.025"×0.025" square transparent regions arranged in a square pattern and separated by 0.025" black lines. The center-to-center distance between adjacent open squares was 0.050". The microprism substate was a 0.004" thick Hostaphan 4500 polyester film produced by Hoechst Celanese. The Hostaphan 4500 film was coated on both sides with a solvent adhesion layer. The substrate was placed in intimate contact with the mask by placing a few milliliters of methanol between the mask and the substrate film and pressing the two pieces together with a rubber roller. The backing plate used during the exposure was a 0.25" thick glass plate coated with a thin film of Rain-X, a commercially available material. The backing plate was placed on a horizontal surface and approximately five milliliters of the liquid photopolymerizable mixture was pipetted onto the center of the plate. The photopolymerizable mixture consisted of approximately 65.1% ethoxylated bisphenol A diacrylate, 32.6% trimethylolpropane triacrylate; 0.3% pentaerythritol tetrabis(3,5-di-tert-butyl-4-hydroxyphenyl) (tradename Irganox 1010) antioxidant, 0.67% α,α-dimethyloxy-α-hydroxy acetophenone (Darocur 1173) photoinitiator, 0.67% benzidimethyl ketal (Irgacure 651) photoinitiator and 0.67% Irgacure 500 photoinitiator. The total percentage of photoinitiators was 2.0%. Metal spacers, 4"×0.5"×0.016" thick, were placed around the edges of the backing plate. The photomask/substrate assembly was placed, substrate side down, on top of the photopolymerizable mixture. A clear glass 5"×5"×0.25" thick plate was placed on top of this entire fabrication assembly and metal clamps and screws were used to fully and evenly compress the plates together resulting in a 0.016" thick photopolymerizable layer between the backing plate and the substrate polyester film.

In order to form microprisms with two sides in the shape of trapezoids, the entire fabrication assembly was placed under the collimating lens of a UV radiation exposure system (same as for Example I) and was first tilted at an angle of approximately +60° with respect to a horizontal surface. The sample was irradiated in that position for 2 seconds. Second, the fabrication assembly was then rotated −120° to a new orientation of approximately −60° with respect to the same horizontal surface. The sample was again irradiated for 2 seconds. The first and second exposure steps were each repeated three more times for a total exposure of 8 seconds in each of the two orientations. The fabrication assembly was then dissassembled and the array film with the microprisms now formed, but still covered with unreacted photopolymerizable material in the interstitial regions between the microprisms, was placed in a stirred bath of isopropanol and left for ten minutes. After removal of the residual monomer, the microprisms were dried in a stream of nitrogen gas, placed in a nitrogen gas-purged enclosure with a quartz window, and hard cured under the UV radiation for an additional 20 seconds.

Optical microscopy was used to evaluate the microprisms. The individual microprisms had six faces, four side faces and a top and bottom face. Two of the side faces, on opposite sides of the microprisms, were observed to have approximately the shape of trapezoids. The faces of the microprisms adjacent to the substrate (as illustrated in FIG. 19B) were approximately squares with dimensions of 0.025"×0.025". The faces of the microprisms opposite the substrate (as illustrated in FIG. 19B) were approximately rectangular in shape with dimensions of 0.025"×0.045". The height of the prisms was approximately 0.016", the thickness of the metal spacers used in the fabrication assembly. The non-parallel edges of the two trapezoidal faces of the microprisms formed angles of approximately 30° with respect to imaginary line drawn perpendicular the surface of the substrate.

To test the operation of the microprisms, the array of microprisms on the polyester substrate was placed on a slab of clear acrylic plastic with approximate dimensions of 12"×6"×0.25" thick. A thin film of water was placed between the polyester substrate and the acrylic slab so that light could easily couple between the slab and the substrate of the microprism array. Light from a 1 Watt fluorescent bulb was coupled into one of the 0.25" thick sides of the acrylic slab. The array of microprisms on the polyester substrate was turned sequentially so that each of the 4 sides of the microprisms was facing the fluorescent lamp. In two of the four orientations, the orientation of FIG. 10, light from the slab was coupled out of the tops of the microprisms in a range of directions covering an angular distribution of approximately 50°, measured as the full width of the angular distribution at the 50% intensity points. The center of the light distribution coming from the microprisms was in a direction approximately perpendicular to the surface of the slab. Alternatively the light distribution could be described as extending ±25° either side of an imaginary line drawn perpendicular to the plane of the substrate. In the other two orientations of the microprisms, very little light was observed being emitted in the direction perpendicular the surface of the slab.

EXAMPLE IV

Microprisms in the shape of truncated pyramids as illustrated in FIGS. 14–18 with 0.050"×0.050" square tops were formed on 0.004" thick polyester film using the method illustrated in FIG. 19C. The photomask was a 5"×5" glass mask with 0.025"×0.025" square transparent regions arranged in a square pattern and separated by 0.025" black lines. The center-to-center distance between adjacent open squares was 0.050". The microprism substate was a 0.004" thick Hostaphan 4500 polyester film produced by Hoechst Celanese. The Hostaphan 4500 film was coated on both sides with a solvent adhesion layer. A spacer film, a 0.032" thick sheet of transparent polyester, was placed between the microprism substrate and the photomask. The substrate, spacer film and photomask were sandwiched together by placing a few milliliters of methanol between the substrate and the spacer film and a few milliliters of methanol between the spacer film and the mask and then pressing the three pieces together with a rubber roller. The backing plate used during the exposure was a 0.25" thick glass plate coated with a thin film of Rain-X, a commercially available material. The backing plate was placed on a horizontal surface and approximately ten milliliters of the liquid photopolymerizable mixture was pipetted onto the center of the plate. The photopolymerizable mixture consisted of approximately 64% ethoxylated bisphenol A diacrylate, 32% trimethylolpropane triacrylate; 2% α,α-dimethyloxy-α-hydroxy acetophenone (Darocur 1173) photoinitiator, 2% benzidimethyl ketal (Irgacure 651) photoinitiator and 2% Irgacure 500 photoinitiator. The total percentage of photoinitiators was 6%. Plastic spacers 0.040" thick were placed around the edges of the backing plate. The photomask/spacer/substrate assembly was placed, substrate side down, on top of the photopolymerizable mixture. A clear glass 5"×5"×0.25" thick plate was placed on top of this entire fabrication assembly and metal clamps and screws were used to fully and evenly compress the plates together resulting in a 0.040" thick photopolymerizable layer between the backing plate and the substrate polyester film.

In order to form microprisms in the shape of truncated pyramids, the entire fabrication assembly was placed under the collimating lens of an UV radiation exposure system (same as for Example I). A light diffuser, a thin translucent sheet of plastic, was placed between the photomask and the collimated lens of the UV radiation exposure system which caused the ultraviolet light to be spread over a range of angles. In order to form microprisms in the shape of truncated pyramids, the diffuser was chosen so that the UV light spread over a full angle (measured at the 50% intensity points) of approximately 20 degrees. The fabrication assembly was irradiated with UV light for 100 seconds. The fabrication assembly was then dissassembled and the array film with the microprisms now formed, but still covered with unreacted photopolymerizable material in the interstitial regions between the microprisms, was placed in a stirred bath of isopropanol and left for ten minutes. After removal of the residual monomer, the microprisms were dried in a stream of nitrogen gas, placed in a nitrogen gas-purged enclosure with a quartz window, and hard cured under the UV radiation for an additional 20 seconds.

Optical microscopy was used to evaluate the microprisms. The individual microprisms had six faces, four side faces and a top and bottom face. The top faces, where, in this example, the top faces were fabricated to be adjacent to the polyester substrate, were approximately 0.050"×0.050" squares. The bottom faces, opposite the polyester substrate, were approximately 0.015"×0.015" squares. The height of the microprisms was approximately 0.040". Each of the identical four side faces of the microprisms had the shape of a trapezoid and was tilted at an angle of approximately 30° with respect to an imaginary line drawn perpendicular to the surface of the substrate.

To test the operation of the microprisms, the exposed 0.015"×0.015" bottom faces of the array of microprisms were pressed onto a slab of clear acrylic plastic with approximate dimensions of 12"×6"×0.25" thick that had been coated with a thin film of the same photopolymerizable mixture used to make the microprisms. This structure was exposed to UV light for approximately 20 seconds to bond the bottom faces of the microprisms to the acrylic slab. The thin film of photopolymerized mixture served as the adhesion layer 154 as shown in FIG. 15. Light from a 1 Watt fluorescent bulb was coupled sequentially into each one of the 0.25" thick sides of the acrylic slab. For each of the four positions of the fluorescent bulb, light from the slab was coupled out of the tops of the microprisms in a range of directions covering an angular distribution of approximately 50°, measured as the full width of the angular distribution at the 50% intensity points. The center of the light distribution coming from the microprisms was in a direction approximately perpendicular to the surface of the slab. Alternatively the light distribution could be described as extending ±25° either side of an imaginary line drawn perpendicular to the plane of the substrate.

EXAMPLE V

Arrays of microlenses as illustrated in FIGS. 7–9 with center-to-center spacings of 0.050" were formed on 0.004" thick polyester film using the photoexposure setup illustrated in FIG. 19C. The photomask was a 5"×5" glass mask with 0.025"×0.025" square transparent regions arranged in a square pattern and separated by 0.025" black lines. The center-to-center distance between adjacent open squares was 0.050". The microlens substate was a 0.004" thick Hostaphan 4500 polyester film produced by Hoechst Celanese. The Hostaphan 4500 film was coated on both sides with a solvent adhesion layer. A spacer film, a 0.013" thick sheet of transparent polyester was placed between the microlens substrate and the photomask. The substrate, spacer film and photomask were sandwiched together by placing a few milliliters of methanol between the substrate and the spacer film and a few milliliters of methanol between the spacer film and the mask and then pressing the three pieces together with a rubber roller. The backing plate used during the exposure was a 0.25" thick glass plate coated with a thin film of Rain-X, a commercially available material. The backing plate was placed on a horizontal surface and approximately ten milliliters of the liquid photopolymerizable mixture was pipetted onto the center of the plate. The photopolymerizable mixture consisted of approximately 64% ethoxylated bisphenol A diacrylate, 32% trimethylolpropane triacrylate; 2% α,α-dimethyloxy-α-hydroxy acetophenone (Darocur 1173) photoinitiator, 2% benzidimethyl ketal (Irgacure 651) photoinitiator and 2% Irgacure 500 photoinitiator. The total percentage of photoinitiators was 6%. Spacers 0.050" thick were placed around the edges of the backing plate. The photomask/spacer/substrate assembly was placed, substrate side down, on top of the photopolymerizable mixture. A clear 5"×5"×0.25" thick glass plate was placed on top of this entire fabrication assembly and metal clamps and screws were used to fully and evenly compress the plates together resulting in a 0.050" thick photopolymerizable layer between the backing plate and the substrate polyester film.

In order to form the microlens array, the entire fabrication assembly was placed under the collimating lens of a UV radiation exposure system (same as for Example I). An opal light diffuser (Oriel Corporation) was placed between the photomask and the collimating lens of the UV radiation exposure system which caused the ultraviolet light to be spread over a range of angles. In order to form microlenses, the diffuser was chosen so that the light spread over a full angle (measured at the 50% intensity points) of approximately 90 degrees. The fabrication assembly was irradiated with UV light for 25 seconds. The area of photopolymerization did not come in contact with the backing plate. The fabrication assembly was then dissassembled and the array film with the microlenses now formed, but still covered with unreacted photopolymerizable material in the interstitial regions between the microlenses, was placed in a stirred bath of isopropanol and left for ten minutes. After removal of the residual monomer, the microlenses were dried in a stream of nitrogen gas, placed in a nitrogen gas-purged enclosure with a quartz window, and hard cured under the UV radiation for an additional 20 seconds.

Optical microscopy was used to evaluate the microlenses. The individual microlenses were round with a diameter of approximately 0.050". The height of the microlenses was approximately 0.025".

The microlens array was tested together with the microprism array that was described in Example I. The microprism array of Example I was placed on a slab of clear acrylic plastic with approximate dimensions of 12"×6"×0.25" thick. A thin film of water was placed between the polyester substrate and the acrylic slab so that light could easily couple between the slab and the substrate of the microprism array. Light from a 1 Watt fluorescent bulb was coupled into one of the 0.25" thick sides of the acrylic slab. The microprism array was rotated so that the maximum amount of light would be coupled out to top surfaces of the microprisms. This is the orientation shown in FIG. 2. The light was coupled out of the tops of the microprisms in a range of directions coveting an angular distribution of approximately 50°, measured as the full width of the angular distribution at the 50% intensity points. A 0.008" thick polyester spacer layer was placed on top of the microprism array. Then the microlens array was placed on top of the spacer film and aligned so that the maximum amount of light was emitted perpendicular to the plane of the slab. With the microlens array in place over the microprism array, the width of angular distribution of the light emission was reduced to approximately 25° ($\pm$12.5° from a line perpendicular to the plane of the acrylic slab) from approximately 50° when the microprisms were used alone. The microlens array had further collimated the partially collimated light coupled out of the microprism array.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A backlight assembly for use in a flat panel electronic display, said display having a modulating means capable of providing an image to a remotely positioned observer, and said backlight assembly comprising:
   (a) a light generating means for generating a first source of light rays;
   (b) a light transmitting means having a first light accepting surface in close proximity to said light generating means, wherein said light transmitting means transports the light rays emanating from said light generating means in a direction substantially parallel to the viewing plane of said modulating means;
   (c) reflecting means for collimating said light rays, said reflecting means disposed between said light transmitting means and said modulating means and comprising an array of microprisms and each microprism comprising:
      i) a light input surface optically coupled to said light transmitting means
      ii) a light output surface distal from and parallel to said light input surface; and
      iii) a first sidewall disposed between and contiguous with said light input surface and said light output surface and forming a tilt angle with respect to the normal of the surface of said light transmitting means and further positioned for effecting total reflection of said light rays received by said input surface;

whereby said light rays internally reflected by said sidewall emerge through said light output surface in a direction substantially perpendicular to said modulating means.

2. The backlight assembly of claim 1 wherein said tilt angle is between about 25 degrees to about 40 degrees.

3. The backlight assembly of claim 1 further comprising a second sidewall oppositely disposed from said first sidewall and wherein the surface area of said light output surface is greater than the surface area of said light input surface and both first and second sidewalls form said tilt angle with respect to the normal of the surface of said light transmitting means and further positioned for effecting total reflection of said light rays received by said input surface.

4. The backlight assembly of claim 3 wherein said light generating means further comprises a second light source in close proximity to a second light accepting surface oppositely disposed to said first light accepting surface.

5. The backlight assembly of claim 1 wherein said light generating means further comprises a third light source in close proximity to a third light accepting surface and a fourth light source in close proximity to fourth light accepting surface, said third and fourth light accepting surfaces being generally perpendicular to said first and second light accepting surfaces and said microprisms further comprise a third and fourth sidewall generally perpendicular to said first and second sidewalls and tilted at angles from the direction normal to the surface of said light transmitting means, wherein said light output surface area is greater than the area of said light input surface.

6. The backlight assembly of claim 5 wherein each said angle is between about 25 degrees to about 40 degrees.

7. The backlight assembly of claim 1 further comprising an array of microlenses disposed in close proximity between said reflecting means and said modulating means, wherein the light output of each microprism is directed to a corresponding microlens and said light transmitted through said microlenses emerges as a substantially more collimated light source for said modulating means.

8. The backlight assembly of claim 7 wherein said microprisms and microlenses are constructed from organic polymeric material.

9. The backlight assembly of claim 7 wherein the microprisms possess a height dimension of less than 2 millimeters and further comprise a light input surface and a light output surface with largest dimension of less than 2 millimeters across.

10. The backlight assembly of claim 7 wherein said microprisms, microlenses and light transmitting means have an index of refraction of between about 1.45 and about 1.65.

11. The backlight assembly of claim 10 further comprising an interstitial region between said microprisms having an index of refraction less than the index of refraction of said microprisms.

12. The backlight assembly of claim 1 wherein the summation of said microprism light input surfaces occupy greater than 20 percent of the surface area of said light transmitting means.

13. A backlight assembly for use in a flat panel electronic display, said display having a modulating means capable of providing an image to a remotely positioned observer, and said backlight assembly comprising:
   (a) a light generating means for generating a source of light rays;
   (b) a light transmitting means substantially related in surface area with said modulating means and having a light accepting surface adjacently positioned next to said light generating means, wherein said light transmitting means transports the light rays emanating from said light generating means via substantially total internal reflection in a direction substantially parallel to the viewing plane of said modulating means;
   (c) an array of microprisms disposed between said light transmitting means and said modulating means and each microprism having a light input surface optically coupled to said light transmitting means and a light output surface distal from and parallel to said light input surface and at least one sidewall tilted at an angle from between about 25 degrees to about 40 degrees from the direction normal to the surface of said light transmitting means and positioned for effecting total reflection of said light rays received by said input surface;
   wherein, said light rays reflecting through said light transmitting means enter said microprisms through said light input surfaces and emerge through said light output surfaces in a direction substantially perpendicular to said modulating means; and
   (d) an array of microlenses disposed in close proximity between said array of microprisms and said modulating means, wherein said output of each microprism is directed to a corresponding microlens and said light transmitted through said microlenses emerges as a substantially more collimated light source for said modulating means.

14. A backlight assembly for use in a flat panel electronic display, said display having a modulating means capable of providing an image to a remotely positioned observer, and said backlight assembly comprising:
   (a) a light generating means for generating a first and second source of light rays;
   (b) a transparent light transmitting means substantially related in surface area with said modulating means and having two light accepting surfaces, each adjacently positioned next to one of said light sources, wherein said light transmitting means transports the light rays emanating from said light generating means via substantially total internal reflection in a direction substantially parallel to the viewing plane of said modulating means;
   (c) an array of microprisms disposed between said light transmitting means and said modulating means and each microprism having a light input surface optically coupled to said light transmitting means and a light output surface distal from and parallel to said light input surface and a first and second sidewall tilted at an angle from between about 25 degrees to about 40 degrees from the direction normal to the surface of said light transmitting means and positioned for effecting total reflection of said light rays received by said input surface, wherein said light output surface area is greater than the area of said light input surface;
   wherein, said light rays reflecting through said light transmitting means enter said microprisms through said light input surfaces and emerge through said light output surfaces in a direction substantially perpendicular to said modulating means; and
   (d) an array of microlenses disposed in close proximity between said array of microprisms and said modulating means, wherein said output of each microprism is directed to a corresponding microlens and said light transmitted through said microlenses emerges as a substantially more collimated light source for said modulating means.

15. A backlight assembly for use in a flat panel electronic display, said display having a modulating means capable of providing an image to a remotely positioned observer, and said backlight assembly comprising:
   (a) a light generating means for generating a first, second, third and fourth source of light rays;
   (b) a light transmitting means substantially related in surface area with said modulating means having four light accepting surfaces, each adjacently positioned next to one of said light generating means, wherein said light transmitting means transports the light rays emanating from said light generating means via substantially total internal reflection in a direction substantially parallel to the viewing plane of said modulating means;
   (c) an array of microprisms disposed between said light transmitting means and said modulating means and each microprism having a light input surface optically coupled to said light transmitting means and a light output surface distal from and parallel to said light input surface and a first, second, third and fourth sidewall tilted at an angle from between about 25 degrees to about 40 degrees from the direction normal to the surface of said light transmitting means and positioned for effecting total reflection of said light rays received by said input surface wherein said light output surface area is greater than the area of said light input surface;
   wherein, said light rays reflecting through said light transmitting means enter said microprisms through said light input surfaces and emerge through said light output surfaces in a direction substantially perpendicular to said modulating means; and
   (d) an array of microlenses disposed in close proximity between said array of microprisms and said modulating means, wherein said output of each microprism is directed to a corresponding microlens and said light transmitted through said microlenses emerges as a substantially more collimated light source for said modulating means.

16. An assembly for providing substantially collimated light from a light source comprising:
   (a) a light transmitting means in close proximity to said light source, wherein said light transmitting means transports the light rays emanating from said light source;
   (b) reflecting means for collimating said light rays comprising an array of microprisms with each microprism having a light input surface optically coupled to said light transmitting means, a light output surface distal from and parallel to said light input surface and at least one sidewall positioned for effecting total reflection of said light rays received by said input surface;
   wherein, said light rays reflecting through said light transmitting means enter said microprisms through said light input surfaces and emerge through said light output surfaces in a direction substantially perpendicular to said light output surface.

17. The assembly of claim 16 further comprising an array of microlenses disposed in close proximity to said array of microprisms wherein the light output of each microprism is directed to a corresponding microlens and said light transmitted through said microlenses emerges as a substantially more collimated light source.

18. A direct-view flat panel display comprising:
   (a) a light generating means for generating light rays;
   (b) a modulating means for modulating light from said light generating means to form an image visible to a remote observer;
   (c) an image display means for displaying said image from said modulating means positioned adjacent to the light output surface of said modulating means, said display means comprising an array of tapered optical waveguides, the tapered end of each of said waveguides extending outward from said modulating means and having a light input surface optically coupled to said modulating means and a light output surface distal from said light input surface;
   (d) a backlight assembly comprising:
      (i) a light transmitting means substantially related in surface area with said modulating means and having a light accepting surface positioned adjacent to said light generating means, wherein said light transmitting means transports the light rays emanating from said light generating means via substantially total internal reflection in a direction substantially parallel to the viewing plane of said modulating means;
      (ii) reflecting means for collimating said light rays, said reflecting means disposed between said light transmitting means and said modulating means, said reflecting means comprising an array of microprisms with each microprism having a light input surface optically coupled to said light transmitting means and a light output surface distal from and parallel to said light input surface and at least one sidewall positioned for effecting total reflection of said light rays received by said input surface;
   wherein, said light rays reflecting through said light transmitting means enter said microprisms through said light input surfaces and exit through said light output surfaces in a direction substantially perpendicular to said modulating means.

19. The direct-view flat panel display of claim 18 further comprising an array of microlenses disposed in close proximity between said reflecting means and said modulating means, wherein the output of each microprism is directed to a corresponding microlens and said light transmitted through said microlenses emerges as a substantially more collimated light source for said modulating means.

* * * * *